US011489906B2

(12) United States Patent
Verma et al.

(10) Patent No.: US 11,489,906 B2
(45) Date of Patent: **\*Nov. 1, 2022**

(54) SYSTEMS AND METHODS FOR RECURRENT AND ADAPTIVE ELECTRONIC NOTIFICATIONS

(71) Applicant: Coupang Corp., Seoul (KR)

(72) Inventors: Vinay Verma, Fremont, CA (US); Satyavaraprasad Vadlamudi, Santa Clara, CA (US); Xinli Bao, Palo Alto, CA (US); Tiziano Cembali, Seoul (KR)

(73) Assignee: Coupang Corp., Seoul (KR)

( * ) Notice: Subject to any disclaimer, the term of this patent is extended or adjusted under 35 U.S.C. 154(b) by 84 days.

This patent is subject to a terminal disclaimer.

(21) Appl. No.: 17/218,407

(22) Filed: Mar. 31, 2021

(65) Prior Publication Data

US 2022/0182468 A1 Jun. 9, 2022

Related U.S. Application Data

(63) Continuation of application No. 17/116,813, filed on Dec. 9, 2020, now Pat. No. 10,999,416.

(51) Int. Cl.
*H04L 67/01* (2022.01)
*G06Q 30/02* (2012.01)
(Continued)

(52) U.S. Cl.
CPC ........ *H04L 67/01* (2022.05); *G06F 16/24578* (2019.01); *G06Q 30/0242* (2013.01);
(Continued)

(58) Field of Classification Search
CPC ....... H04L 67/535; H04L 67/55; H04L 67/02; H04L 69/28; H04L 67/563; G06Q 30/0242

See application file for complete search history.

(56) References Cited

U.S. PATENT DOCUMENTS 9,619,811 B2 4/2017 Mason
10,621,622 B1 4/2020 Kondal et al.
(Continued)

FOREIGN PATENT DOCUMENTS

CN 108416620 A 8/2018
CN 109003148 A 12/2018
(Continued)

OTHER PUBLICATIONS

Notice of Preliminary Rejection from the Korean Intellectual Property Office, dated Jun. 17, 2022, for counterpart Korean Patent Application No. 10-2021-7020556 (5 pgs) and translation (5 pgs.).
(Continued)

*Primary Examiner* — Mahran Y Abu Roumi
(74) *Attorney, Agent, or Firm* — Finnegan, Henderson, Farabow, Garrett & Dunner LLP

(57) ABSTRACT

A system for generating adaptive notifications including processors and memories storing instructions that configure the processors to perform operations. The operations may include generating an item list for notifications to a client ID, selecting a first item from the item list for notification, the first item being selected having a highest priority score and a lowest lifecycle timer, encoding a first landing page by encoding a product code and a tracking cookie in a URL configured for redirection to a first webpage by a redirect server, and transmitting a first notification with a payload including the first landing page and a first message. The operations may also include after transmitting the first notification, modifying priority scores and updating lifecycle timers based on determining whether the client device visited the first landing page. Further, the operations may also include selecting a second item from the item list for notification.

16 Claims, 26 Drawing Sheets

(51) Int. Cl.
   *H04L 67/02*      (2022.01)
   *G06F 16/2457*    (2019.01)
   *H04L 67/55*      (2022.01)
   *H04L 67/561*     (2022.01)

(52) U.S. Cl.
   CPC .............. *H04L 67/02* (2013.01); *H04L 67/55* (2022.05); *H04L 67/561* (2022.05)

(56) References Cited

U.S. PATENT DOCUMENTS

| | | | |
|---|---|---|---|
| 10,674,206 | B1 | 6/2020 | Sabelli et al. |
| 2006/0153358 | A1 | 7/2006 | Zernovizky et al. |
| 2008/0154798 | A1* | 6/2008 | Valz ................ G06F 16/9535 707/E17.014 |
| 2011/0173065 | A1* | 7/2011 | Lester ................ G06Q 30/02 705/14.45 |
| 2012/0258691 | A1 | 10/2012 | Baer et al. |
| 2013/0311332 | A1* | 11/2013 | Favish ............. G06Q 30/0269 705/26.41 |
| 2013/0346521 | A1* | 12/2013 | Arabo ................ H04L 67/61 709/206 |
| 2014/0273978 | A1* | 9/2014 | Van Snellenberg .... H04W 4/00 455/412.2 |
| 2016/0021202 | A1 | 1/2016 | Peterson et al. |
| 2016/0071189 | A1* | 3/2016 | Sakurai ............ G06Q 30/0641 705/26.81 |
| 2016/0098753 | A1 | 4/2016 | Login et al. |
| 2016/0373891 | A1* | 12/2016 | Ramer ................ H04W 4/024 |
| 2017/0118303 | A1* | 4/2017 | Ratiu ................ H04L 67/55 |
| 2017/0118304 | A1* | 4/2017 | Ratiu ................ H04L 67/53 |
| 2018/0046929 | A1* | 2/2018 | Xuan ................ G06Q 10/00 |
| 2018/0139294 | A1 | 5/2018 | Ju et al. |
| 2018/0145842 | A1* | 5/2018 | Golin ................ H04L 47/24 |
| 2018/0181741 | A1* | 6/2018 | Whaley ................ G06F 21/32 |
| 2018/0239790 | A1 | 8/2018 | Miyasaka et al. |
| 2018/0374139 | A1* | 12/2018 | Shrivastava ....... G06Q 30/0631 |
| 2019/0253514 | A1 | 8/2019 | Yankovich et al. |
| 2019/0327322 | A1 | 10/2019 | Justin et al. |
| 2020/0404072 | A1 | 12/2020 | Yankovich et al. |
| 2021/0027485 | A1* | 1/2021 | Zhang ................ G06T 7/73 |

FOREIGN PATENT DOCUMENTS

| | | |
|---|---|---|
| CN | 110555735 A | 12/2019 |
| KR | 10-2015-0066644 | 6/2015 |
| KR | 10-2019-0107990 | 9/2019 |
| KR | 10-2020-0080024 | 7/2020 |
| TW | 200919352 A | 5/2009 |
| TW | 201140479 A | 11/2011 |
| TW | I387932 B | 3/2013 |
| TW | I456518 B | 10/2014 |
| TW | I570645 B | 11/2017 |
| WO | WO 2015/100411 A1 | 7/2015 |

OTHER PUBLICATIONS

Notification of Transmittal of the International Search Report and the Written Opinion of the International Searching Authority, or the Declaration dated Sep. 2, 2021, for counterpart International Application No. PCT/IB2020/062032 (7 pages).

Taiwan Office Action dated Mar. 2, 2022, from the Intellectual Property Office for Patent Application No. 110116765 (9 pages) and Translation (11 pages).

Anshari, Muhammad, et al., "Customer relationship management and big data enabled: Personalization & customization of services," Applied Computing and informatics 15.2 (2019), pp. 94-101.

Okoshi, Tadashi, et al., "Attention and engagement-awareness in the wild: A large-scale study with adaptive notifications," 2017 ieee international conference on pervasive computing and communications (percom), IEEE, 2017 (11 pages).

Okoshi, Tadashi, Kata Tsubouchi, and Hideyuki Tokuda, "Real-World Product Deployment of Adaptive Push Notification Scheduling on Smartphones," Proceedings of the 25th ACM SIGKDD International Conference on Knowledge Discovery & Data Mining, 2019 (10 pages).

Okoshi, Tadashi, et al., "Towards attention-aware adaptive notification on smart phones," Pervasive and Mobile Computing 26 (2016), pp. 17-34.

\* cited by examiner

FIG. 9

Table 910:

| Category | Category Rank | Product-Ids |
|---|---|---|
| Baby | 1 | 101, 110, 120, 675 |
| Beauty | 2 | 215, 230, 250 |
| Detergent | 3 | 309, 330 |
| Fresh Food | 4 | 400, 438, 469 |
| Pets | 5 | 545, 987 |

912 → Category; 914 → Category Rank; 916 → Product-Ids; 918 → (brace)

Table 920:

| Category, Product-Ids | Rank for Push Notification |
|---|---|
| Baby, 101 | 1 |
| Beauty, 215 | 2 |
| Detergent, 309 | 3 |
| Fresh Food, 400 | 4 |
| Pets, 545 | 5 |
| Baby, 110 | 6 |
| Beauty, 215 | 7 |
| Detergent, 330 | 8 |
| Fresh Food, 438 | 9 |
| Pets, 987 | 10 |
| Baby, 120 | 11 |

922 → Category, Product-Ids; 924 → Rank for Push Notification; 926 → (brace)

FIG. 22

SYSTEMS AND METHODS FOR RECURRENT AND ADAPTIVE ELECTRONIC NOTIFICATIONS

CROSS-REFERENCE TO RELATED APPLICATIONS

This application is a continuation of Application Ser. No. 17/116,813, filed Dec. 9, 2020, the disclosure of which is expressly incorporated herein by reference in its entirety.

TECHNICAL FIELD

The present disclosure generally relates to computerized systems and methods for automatically configuring and transmitting electronic notifications to mobile devices. In particular, embodiments of the present disclosure relate to systems and methods for generating recurrent and adaptive push notifications employing individually encoded landing pages, which allow to track user interaction with the notifications, and dynamic item rankings with multi-variable parameters, which allows automated selection of notification content.

BACKGROUND

Asynchronous electronic notifications are mechanisms for sending unsolicited data from server to client devices. For example, push notifications allow content providers to delivery messages directly to a user interface (e.g., a home screen), mobile applications, and/or desktop applications. The asynchronous notifications can be local notifications (e.g., pre-programmed notifications managed by a local OS and/or stored in local memories) or remote notifications. Remote notifications create a direct communication channel between servers and clients. For example, in remote push notifications a server registers clients with a unique key (e.g., a universally unique identifier, UUID) and then remotely transmit messages using the UUID to deliver one-way messages to selected clients via an agreed client/server protocol—such as Hypertext Transfer Protocol (HTTP) or Extensible Messaging and Presence Protocol (XMPP). Asynchronous electronic notifications can be configured to transmit short messages, application icons, blinking signals, and/or sounds to attract users' attention.

While asynchronous notifications can be effective to capture the user attention, they are intrusive and may cause an interruption overload that drives users to ignore notifications and/or opt-out from push notification services. Users of mobile devices are frequently exposed to multiple interruptions from multiple devices. Further, because of small payload sizes in certain asynchronous communications (e.g., push notifications have limited payloads, in kilobyte orders) and restrictions of operating systems/networks, asynchronous electronic notifications frequently look alike, are difficult to customize, and can be hard to distinguish. Under such overloaded computing environment, notifications users frequently ignore notifications. Particularly because a large amount of similarly looking interruptions divide the user attention and undermine the effectiveness of the electronic notifications. Indeed, in many cases users decide to uninstall applications or unsubscribe to services that appear too intrusive.

Due to such interruption and/or electronic notification overload, content producers or providers need to evaluate the opportunity cost for each push notification that is transmitted to the client. Content producers need to carefully select what content to push to clients and when to push it. For instance, content producers are incentivized to limit the transmission of push notifications and to maximize the relevance of each notification. But determining opportune time for delivery and/or relevant content is complex and usually left to impromptu conjectures that are difficult to replicate, optimize, and/or automate.

The disclosed systems and methods for recurrent and adaptive push notifications address one or more problems set forth above and/or other problems in the prior art.

SUMMARY

One aspect of the present disclosure is directed to a system for generating adaptive electronic notifications. The system may include at least one processor and at least one memory device including instructions that when executed configure the at least one processor to perform operations. The operations may include generating an item list for notifications to a client ID, where the item list is associated with category IDs and product IDs and items in the item list are associated with priority scores and lifecycle timers. The operations may also include selecting a first item from the item list for notification, where the first item is selected as having a highest priority score and a lowest lifecycle timer and the first item is associated with a first product code and a first category ID. The operations may also induce encoding a first landing page by encoding the first product code and a first tracking cookie in a first URL (the first URL being configured for redirection to a first webpage of the first item by a redirect server), and transmitting—to a client device—a first notification with a payload including the first landing page and a first message. The operations may also include, after transmitting the first notification, modifying at least one of the priority scores and updating at least one of the lifecycle timers based on determining—using the first tracking cookie—whether the client device visited the first landing page. Further, the operations may include, after modifying the priority scores, selecting a second item from the item list for notification (the second item being associated with a second product code and a second category ID different from the first category ID).

Another aspect of the present disclosure is directed to a computer-implemented method for generating adaptive electronic notifications. The method may include generating an item list for notifications to a client ID, where the item list is associated with category IDs and product IDs and items in the item list being associated with priority scores and lifecycle timers. The method may also include selecting a first item from the item list for notification, where the first item is selected as having a highest priority score and a lowest lifecycle timer and the first item is associated with a first product code and a first category ID. The method may also induce encoding a first landing page by encoding the first product code and a first tracking cookie in a first URL (the first URL being configured for redirection to a first webpage of the first item by a redirect server), and transmitting—to a client device—a first notification with a payload including the first landing page and a first message. The method may also include, after transmitting the first notification, modifying at least one of the priority scores and updating at least one of the lifecycle timers based on determining—using the first tracking cookie—whether the client device visited the first landing page. Further, the method may include, after modifying the priority scores, selecting a second item from the item list for notification (the second item being associated with a second product code and a second category ID different from the first category ID).

Yet another aspect of the present disclosure is directed to an apparatus. The apparatus may include one or more processors and one or more memory devices storing instructions that configure the one or more processors to: generate an item list for notifications to a client ID, where the item list is associated with category IDs and product IDs, and items in the item list have assigned priority scores and lifecycle timers. Instructions may also configure processors to select a first item from the item list for notification, the first item being selected having a highest priority score and a lowest lifecycle timer, the first item being associated with a first product code and a first category ID. Further, instructions may configure processors to: encode a first landing page by encoding the first product code and a first tracking cookie in a first URL (the first URL being configured for redirection to a first webpage of the first item by a redirect server) and transmit—to a client device—a first notification with a payload including the first landing page and a first message. The instructions may also configure the processors to—after transmitting the first notification—modify at least one of the priority scores and updating at least one of the lifecycle timers based on determining, using the tracking cookie, whether the client device visited the first landing page, and—after modifying the priority scores—select a second item from the item list for notification, the second item being associated with a second product code and a second category ID, different from the first category ID. The instructions may also configure the processors to encode a second landing page by encoding the second product code and a second tracking cookie in a second URL, the second URL being configured for redirection to a second webpage of the second item by the redirect server, and to—in response to determining a notification time lapsed after transmitting the first notification—transmit a second notification with a second payload including the second landing page and a second message. Moreover, the instructions may also configure the processors to modify the priority scores and updating the lifecycle timers based on determining—using the second tracking cookie—whether the client device visited the second landing page; and select a third item from one of the cyclical item list for notification, the third item being associated with a third product code and a third category ID, the third category ID being different from the first category ID and the second category ID.

BRIEF DESCRIPTION OF THE DRAWINGS

FIG. 9 shows exemplary tables of ranked categories and products based on priority scores and lifecycle timers, consistent with disclosed embodiments.

FIG. 22 is an exemplary graphical user interface showing source code with payload configuration, consistent with disclosed embodiments.

DETAILED DESCRIPTION

Figure 1A:
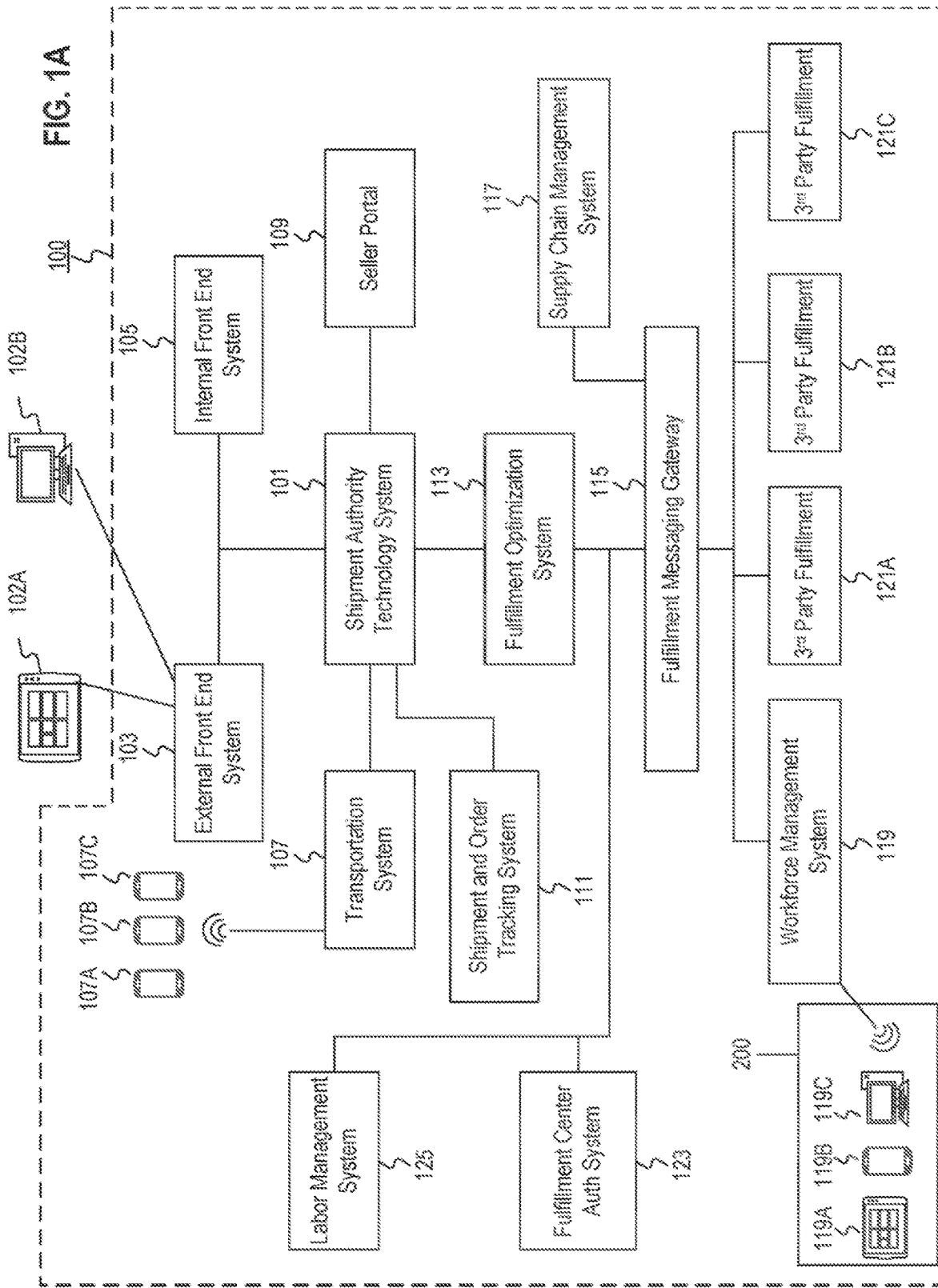
FIG. 1A is a schematic block diagram illustrating an exemplary embodiment of a network including computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. The following detailed description is not limited to the disclosed embodiments and examples. Instead, the proper scope of the invention is defined by the appended claims.

Embodiments of the present disclosure are directed to systems and methods for automated configuration of adaptive and recurrent electronic notifications. Disclosed systems and methods may improve push notification technology by generating push notifications with a payload that includes individualized landing pages that encode feedback and/or tracking information. For example, some of the disclosed embodiments may allow automated and large scale evaluation of push notification engagement by pushing landing pages with encoded tracking cookies. The tracking cookies may allow content providers to assess engagement and inform the future selection of content and/or delivery parameters. Further, embodiments of the disclosed systems and methods enable adapting recurrent push notifications by dynamically generating lists of cyclical products and optimizing the item selection to maximize diversity and enhance engagement. For example, based on the tracking information collected from individually encoded landing pages, disclosed systems and methods may automate content selection and prioritization for push notification. Thus, the combination of tracking features in customized landing pages and dynamical selection of content may improve push notification technology by providing automated selection of push notification content.

Moreover, disclosed systems and methods may also improve asynchronous electronic communications by automating content optimization based on historic purchases and/or network traffic trends. For example, some embodiments of the disclosed systems and methods may route responses to asynchronous communications via redirect servers. The redirect servers can be configured to redirect encoded URLs to content pages while logging network traffic and client behavior. Based on the network traffic analysis, captured from redirect servers, disclosed systems may identify content that is becoming relevant to users and/or content that is no longer relevant to the users. This information may be used to curate push notification content, filtering out content that is unlikely to be relevant to users, and/or increasing the priority (or updating the periodicity) of content that is likely to improve user engagement. In some embodiments, disclosed systems and methods may use network sensors in redirect servers to identify content that is generating greater or lower than expected engagement in real-time. In such embodiments, the disclosed systems and methods may allow to dynamically modify content selection for push notifications by automating content selection tasks for asynchronous communications.

Furthermore, the disclosed systems and methods may also improve push notification technology by enabling push notification customization while minimizing network congestion and payload size. For example, some embodiments of the disclosed systems and methods may allow to customize messages, images, and actions in push notification payloads. In such embodiments, disclosed methods may enable the automated selection and transformation of images and messages for push notification. For example, disclosed systems and methods may allow content providers to tailor images and messages sent with push notification based on historic records of client devices (using for example historic interactions, user preferences, and/or population clustering) to enhance engagement with push notifications. Further, disclosed systems and methods may allow automated split-run testing of push notification payloads to optimize combination of images, messages, and landing page encoding.

Moreover, the disclosed systems and methods may improve push notification technology by providing the ability to automatically collect large training data sets to train machine learning (ML) models that predict likelihood of click-through-rates (CTRs). For example, some of the disclosed systems and methods may allow collecting tracking information and generating metadata labels (specifying items, item categories, and/or type of products) to feed and/or train ML models that predict CTR for different combinations of products, product categories, type of payloads, and/or delivery methods.

Furthermore, the disclosed systems and methods may also improve the technical field of automated customer relationship management (CRM) by combining automated content selection with manager-defined campaign goals. For example, some of the disclosed systems and methods generate cyclical item lists for a marketing campaign. The cyclical (or recurrent) item lists may be curated and organized to enhance diversity of product type (or product categories) to minimize user fatigue and/or attention loss. For example, the cyclical item list may be organized based on product IDs and categories IDs that are sorted using campaign rules based on ML predications and/or campaign goals. For example, the cyclical item list may be sorted with rules such as not repeating the same category sequentially and/or removing items from the marketing campaign if rejected or ignored by the client device. In such embodiments, disclosed systems and methods may provide campaign managers guidance of content and delivery timing for enhanced engagement. Further, disclosed systems and methods may also enable automated adjustments of the cyclical item list based on the manager-defined parameters to generate perpetual but adaptive lifecycle campaigns.

Reference will now be made to the disclosed embodiments, examples of which are illustrated in the accompanying drawings.

FIG. 1A shows a schematic block diagram of system 100 illustrating an exemplary embodiment of a system including computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. SAT system 101 may also monitor data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (HS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may include one or more of these systems, while in another aspect, external front-end system 103 may include interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Display Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request.

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, promised delivery date (PDD), weight, size, offers, discounts, or the like. In some embodiments, the SRP may also include delivery options, cutoff times for delivery options and/or hypermedia elements requesting user input. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. This could include, for example, shelf life, country of origin, weight, size, number of items in package, handling instructions, cutoff time for dawn or first time deliveries, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Display Page) (e.g., FIG. 1C) based on the received product information, location of the customer device, and availability of delivery options. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. Alternatively, or additionally, the user may interact with the SDP by providing instructions for delivery. The user device may transmit this request to add the product to the shopping cart to external front-end system 103.

Figure 1C:
FIG. 1C depicts a sample Single Display Page (SDP) that includes a product and information about the product along with interactive user interface elements, consistent with the disclosed embodiments.
Figure 1D:
FIG. 1D depicts a sample cart page that includes items in a virtual shopping cart along with interactive user interface elements, consistent with the disclosed embodiments.
Figure 1E:
FIG. 1E depicts a sample order page that includes items from the virtual shopping cart along with information regarding purchase and shipping, along with interactive user interface elements, consistent with the disclosed embodiments.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding promised delivery date (PDD), a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103. In some embodiments, the Cart page may include text box inputs, interactive icons, or recommendation messages for each product delivery.

External front-end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the order page and click or otherwise interact with a user interface element that sends the information to external front-end system 103. From there, external front-end system 103 may send the information to different systems in system 100 to enable the creation and processing of a new order with the products in the shopping cart. In some embodiments, external front-end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may include one or more of these systems, while in another aspect, internal front-end system 105 may include interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may include devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured)

operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below regarding FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
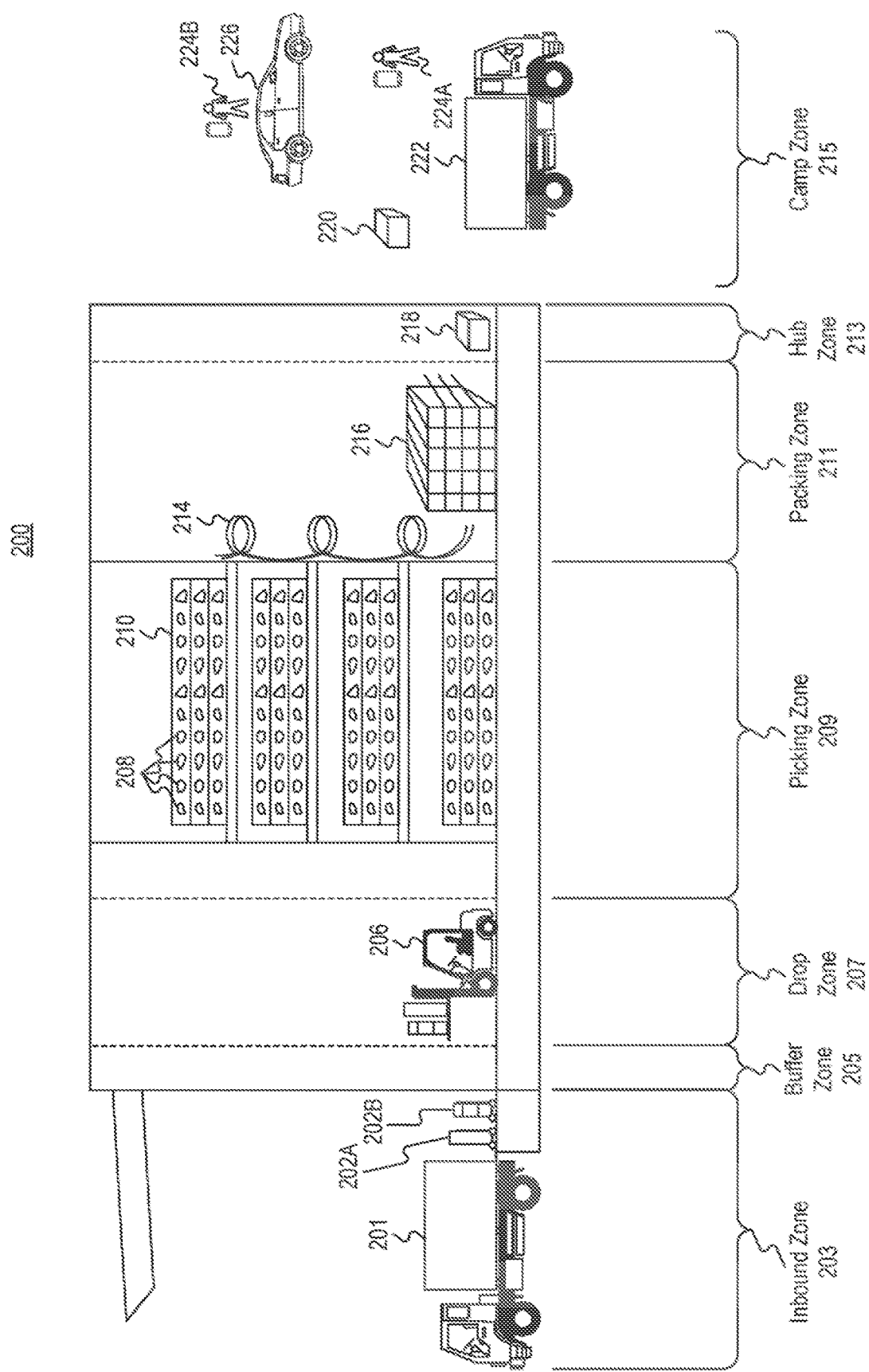
FIG. 2 is a diagrammatic illustration of an exemplary fulfillment center configured to utilize disclosed computerized systems, consistent with the disclosed embodiments.

FIG. 2 depicts a fulfillment center 200. Fulfillment center (FC) 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible and the zones in FIG. 2 may be omitted, duplicated, and/or modified in some embodiments.

Inbound zone 203 represents an area of FC 200 where items are received from sellers who wish to sell products using system 100 (FIG. 1A). For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). Such event may update a real time location system that updates a database to specify the item has been moved into the FC. The picker may then take the item to picking zone 209 (e.g., by placing it on a cart or carrying it) and the real time location system may request the position of storage for the new item.

Picking zone 209 may be an area of FC 200 where items 208 are stored on storage units 210. In some embodiments, storage units 210 may include one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. In some embodiments, the location to stow item 202A may be determined based on predictive algorithms that attempt to maximize the availability of special delivery options, such as dawn deliveries. The device may then prompt the picker to scan a barcode at that location before stowing item 202A in that location. Alternatively, a wireless sensor or a camera coupled with image recognition, may store the location of the time. In some embodiments, the device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. In some embodiments, as further described in connection with FIG. 11, the picker may receive instructions through a placement or storing guide to stow the products. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may include, for example, determining a portion of a geographical area that the package is destined for (e.g., based on a postal code) and determining a camp zone 215 associated with the portion of the geographical area.

Camp zone 215, in some embodiments, may include one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, a delivery option, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
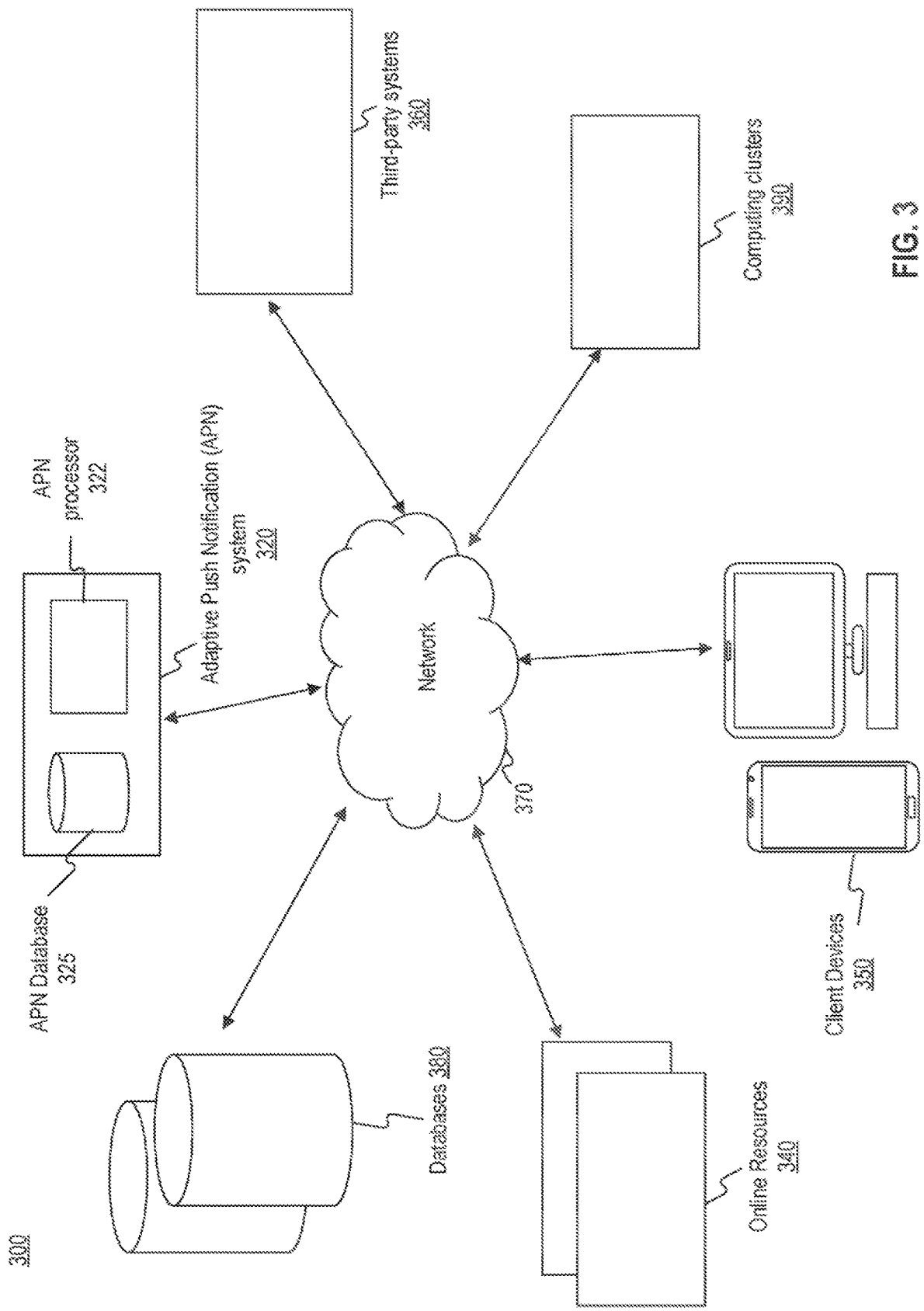
FIG. 3 is a schematic block diagram of an exemplary system, consistent with disclosed embodiments.

FIG. 3 is a block diagram of an exemplary system 300, consistent with disclosed embodiments. In system 300, an adaptive push notification (APN) system 320 may include servers, computer modules, and/or data processing centers configured to process user activity, collect campaign manager parameters, and drive push notification campaigns. In some embodiments, APN system 320 may store and curate content to be transmitted to client devices via push notifications. For example, in an e-commerce context, APN system 320 may selected products that should be transmitted to users via push notifications to incentivize purchases and/or user engagement. In such embodiments, APN system 320 may be configurable to identify products that a user purchase periodically (i.e., recurrent or lock-in items) and send reminders of when a repurchase may be necessary. APN system 320 may be configured to send timely reminder to users that purchase products periodically. For example, if based on past purchase history the user is likely to run out of milk or laundry detergent (cyclical items), APN system 320 may be configured to send reminders push notifications to the user.

Further, APN system 320 may be programmed to automatically optimize content and delivery method of electronic notifications. In some embodiments APN system 320 may identify content with highest likelihood of engagement and adapt adjust recurrent or cyclical item lists. For example, APN system 320 may identify combinations of product images, messages, and landing pages with highest CTRs relative to other combinations and generate push notification payloads with the product image and landing page for that product with high purchase through push notification. Moreover, APN system 320 may also include computer resources to generate and encode tracking devices, such as tracking codes or cookies, and adjust the list of promotable products based on analysis of tracking information and/or campaign goals. Further, APN system 320 may generate GUI displays for managers to include manager-defined parameters when ranking items or content for delivery via push notifications.

APN system 320 may include APN processors 322 that may analyze communications in system 300, generate content selection models, encode landing pages, and/or manage tracking devices. In some embodiments, APN processors 322 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, APN processors 322 may be a plurality of devices coupled and configured to perform functions consistent with the disclosure. Further, APN system 320 may include an APN database 325 that stores and manages itemized and categorized content, lists of cyclical items for lifecycle campaigns, and algorithms to optimize selection of content that will be pushed to users.

In some embodiments, APN system 320 may be implemented with one or more of the components of system 100 (FIG. 1A). For example, APN system 320 may be implemented as part of external front-end system 103, FO system 113, SCM system 117, and/or WMS 119 (FIG. 1A). In other embodiments, APN system 320 may be implemented with one or more independent servers configured to perform operations for generating and providing push notification to client devices. For example, APN system 320 may include, or be connected to, push notification services that allow the configuration and compilation of push notification payloads for later transmission of push notifications to client devices. APN system 320, along with APN processors 322 and APN database 325, are further discussed in connection with FIG. 6.

System 300 may include, besides APN system 320, online resources 340, client devices 350, third-party systems 360, computer clusters 390, and databases 380. In some embodiments, as shown in FIG. 3, components of system 300 may be connected to a network 370. However, in other embodiments components of system 300 may be connected directly with each other, without network 370. For example, databases 380 may be directly coupled to APN system 320.

Online resources 340 may include one or more servers or storage services provided by an entity such as a provider of webpage hosting, networking, cloud, or backup services. In some embodiments, online resources 340 may be associated with hosting services or servers that store web pages for authentication services, Domain Name System (DNS), or landing pages. In other embodiments, online resources 340 may be associated with a cloud computing service. In yet other embodiments, online resources 340 may be associated with a messaging service, such as Apple Push Notification Service, Azure Mobile Services, or Google Cloud Messaging. In such embodiments, online resources 340 may handle the delivery of messages and notifications related to functions of the disclosed embodiments.

Moreover, online resources 340 may include redirect servers that can be configured by APN system 320 to perform tracking operations to evaluate user engagement with push notifications and/or asynchronous communications. For example, online resources 340 may include a redirect server configured to return the URLs or IP address of product pages based on encoded information in pages transmitted through the push notification. In such embodiments, online resources 340 may be configured to decode URLs received from client devices and redirect queries to product URLs based on the decoded information received from the client. Online resources 340 may also be configured to log client requests and decoded information and then returns the logged information to APN system 320 to adapt push notification content and/or change content prioritization, rankings, and categories. In some embodiments, the redirect serves of online resources may be configured as proxy and/or edge servers or switches that perform call re-routing. Alternatively, or additionally, the redirect servers may be configured similar to domain name systems associating the landing URLs (which may be encoded with client ID, tracking cookies, and product IDs) with product pages while logging the redirection to the product page.

In some embodiments, online resources 340 may be programmable by APN system 320. For example, redirect servers in online resources 340 may be programmed by APN system 320 to perform redirections based on encoded information in landing pages and/or URLs received from client devices 350.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments, client devices 350 may include the user devices 102A/102B (FIG. 1A) and be operated as part of system 100. In other embodiments, however, client devices 350 may be independent from system 100. Client devices 350 may include one or more processors configured to execute software instructions stored in memory, such as memory in client devices 350, to perform operations to implement the functions described below. For example, client devices 350 may be configured to display push notifications and/or webpages that are configured by APN system 320. Further, client devices 350 may be configured to perform operations according to instructions transmitted by APN system 320, such as callback scripts or functions. Further, client devices 350 may be configured for wired and/or wireless communications and may include software that when executed by a processor performs internet-related communication (e.g., TCP/IP) and content display processes. For instance, client devices 350 may execute browser software that generates and displays interfaces with product information. Thus, client devices 350 may execute applications that allow client devices 350 to communicate with components over network 370 and display content in interfaces via display devices included in client devices 350.

In some embodiments, as further described below in connection to FIG. 4, client devices 350 may run applications specifically configured to interact with APN system 320. Moreover, client devices 350 may store one or more accounts. For example, client devices 350 may store information about client preferences, such as categories of push notifications that the client is willing to accept.

The disclosed embodiments are not limited to any particular configuration of client devices 350. For instance, a client device 350 may be a mobile device that stores and executes mobile applications to perform operations that provide functions offered by APN system 320 and/or online resources 340. Client devices 350 are further described in connection with FIG. 4.

Databases 380 may include one or more computing devices configured with appropriate software to perform operations consistent with providing APN system 320 data for adjusting content for push notification and/or modifying recurrent item lists pushed to client devices 350. Databases 380 may include, for example, Oracle™ databases, Sybase M databases, or other relational databases or non-relational databases, such as Hadoop™ sequence files, HBase™, or Cassandra™. Databases 380 may include computing components (e.g., database management system, database server, etc.) configured to receive and process requests for data stored in memory devices of the database(s) and to provide data from the database(s).

While databases 380 are shown separately, in some embodiments databases 380 may be included in, or otherwise related to, APN system 320 or online resources 340. Further, databases 380 may be configured to collect and/or maintain data associated with user accounts or products to facilitate determination average purchasing time or identify recurrent items eligible for push notification reminders. For example, databases 380 may store information about user profiles for users of system 300. Further, databases 380 may store information about user preferences, including opt-ins for push notifications and/or preferred product categories. Databases 380 may collect the data from a variety of sources, including, for instance, online resources 340 or third-party systems 360. Further, databases 380 may include information about client devices 350 operating systems. Databases 380 are further described below in connection with FIG. 5.

Third-party systems 360 may include one or more elements of system 100. For example, third-party systems 360 may include 3PL systems 121A-121C (FIG. 1). Additionally, or alternatively, third-party systems 360 may include one or more servers or storage services provided by an entity related to APN system 320, such as a provider of services or a fulfillment center. Third-party systems 360 may also be connected to system 300 via network 370, but in other embodiments third-party systems 360 may include direct connections with some elements of system 300. For example, to minimize delays or network congestion, third-party systems 360 may be connected in a private network with APN system 320. Further, third-party systems 360 may be configured to provide and/or request information from APN system 320, or other elements of system 300. In some embodiments, while third-party systems 360 may also be coupled to network 370, they may not be clients of APN system 320. Instead, third-party systems 360 may include systems that include information of users or clients of APN system 320. For example, third-party systems 360 may include servers of delivery contractors, which may be used by APN system 320 when a product delivery involves a third-party contractor.

Computing clusters 390 may include a plurality of computing devices in communication with network 370. For example, in some embodiments, computing clusters 390 may be a group of processors in communication through fast local area networks. In other embodiments computing clusters 390 may be an array of graphical processing units configured to work in parallel as a GPU cluster. In some embodiments, computing clusters 390 may include a GPU driver for each type of GPU present in each cluster node, a Clustering application programming interface (API), such as the Message Passing Interface, MPI, and VirtualCL (VCL) cluster platform such as a wrapper for OpenCL™ that allows most unmodified applications to transparently utilize multiple OpenCL devices in a cluster. Computer clusters 390 may be configured to process push notification information to, for example, label client interactions and/or visits to encoded landing pages to generate training datasets. Further computing clusters 390 may also be configured to generate machine learning models that predict CTR or client interactions with push notifications and/or process split-run testing between different combinations of images, messages, and landing page encoding of push notifications.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 300. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Figure 4:
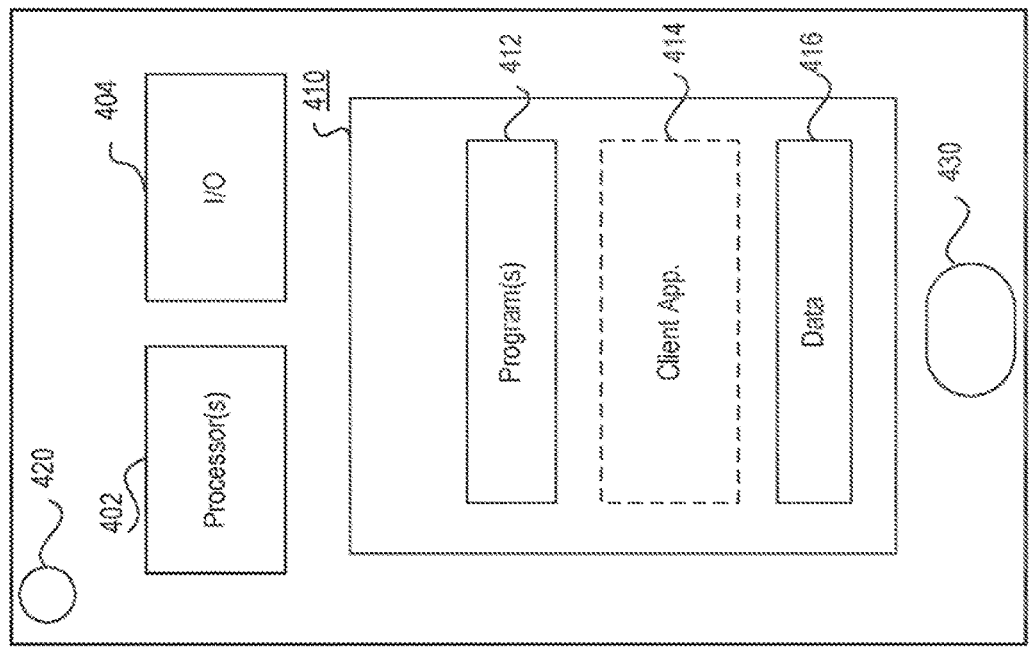
FIG. 4 is a block diagram of an exemplary client device, consistent with disclosed embodiments.

Referring now to FIG. 4, there is shown a block diagram of an exemplary client device 350 (FIG. 3), consistent with disclosed embodiments. In some embodiments, client devices 350 may implement user devices 102 (FIG. 1A).

In one embodiment, client devices 350 may include one or more processors 402, one or more input/output (I/O) devices 404, and one or more memories 410. In some embodiments, client devices 350 may take the form of mobile computing devices such as smartphones or tablets, general purpose computers, or any combination of these components. Alternatively, client devices 350 (or systems including client devices 350) may be configured as a particular apparatus, embedded system, dedicated circuit based on the storage, execution, and/or implementation of the software instructions that perform one or more operations consistent with the disclosed embodiments. According to some embodiments, client devices 350 may include web browsers or similar computing devices that access web site consistent with disclosed embodiments.

Processor 402 may include one or more known processing devices, such as mobile device microprocessors manufactured by Intel™, NVIDIA™, or various processors from other manufacturers. The disclosed embodiments are not limited to any specific type of processor configured in client devices 350.

Memory 410 may include one or more storage devices configured to store instructions used by processor 402 to perform functions related to disclosed embodiments. For example, memory 410 may be configured with one or more software instructions, such as programs 412 that may perform operations when executed by processor 402. The disclosed embodiments are not limited to separate programs or computers configured to perform dedicated tasks. For example, memory 410 may include a single program 412 that performs the functions of the client devices 350, or program 412 may include multiple programs. Memory 410 may also include a client application 414 which may configure client devices 350 to communicate or execute operations to interact with other elements of system 300. For example, client application 414 may specify instructions to display push notifications received from APN system 320 and/or communicate back with APN system 320 directly or through a redirect server. In addition, client applications 414 may interpret instructions for generating graphical user interfaces (GUI) in client devices 350 or calling user attention through sound, vibration, or flash. Moreover, client applications 414 may allow users to interact with APN database 325 to perform operations like read, write, and/or collecting information so users can modify their preferences and/or update campaign parameters. Memory 410 may also store data 416 that may be used by APN system 320 to generate and maintain recurrent item lists with information about orders or products.

In certain embodiments, memory 410 may store instructions for accessing or sending requests to APN system 320. For example, memory 410 may include an application that communicates with APN system 320 via TCP/IP. Alternatively, or additionally, memory 410 may include information for communicating with APN system 320 through application programming interface (API) methods. Moreover, other software components may be configured to request information from APN system 320 or determine the location of client devices 350. For instance, software instructions in programs 412, when executed by processor(s) 402, may process information to display a list of items in a webpage. The software instructions may also implement scripts to transmit feedback information to APN systems 320, such as executing callback functions or encoding tracking cookies.

I/O devices 404 may include one or more devices configured to allow data to be received and/or transmitted by client devices 350 and to allow client devices 350 to communicate with other machines and devices, such as other components of system 300. For example, I/O devices 404 may include a screen for confirming delivery of a parcel or providing information to the user. I/O devices 404 may also include components for NFC communication. I/O devices 404 may also include one or more digital and/or analog devices that allow a user to interact with client devices 350 such as a touch-sensitive area, buttons, or microphones. VO devices 404 may also include one or more accelerometers to detect the orientation and inertia of client devices 350. I/O devices 404 may also include other components known in the art for interacting with APN system 320.

In some embodiments, client device 350 may also include a camera 420 that capture images and may be used for identification of a product. Such identification may trigger requests for content information for display and/or updates to the push notification content cycle. Additionally, or alternatively, client devices 350 may include a fingerprint sensor 430 that allows users to unlock client devices 350 to access their accounts, send request for information, and purchase items.

The components of client devices 350 may be implemented in hardware, software, or a combination of both hardware and software, as will be apparent to those skilled in the art.

Figure 5:
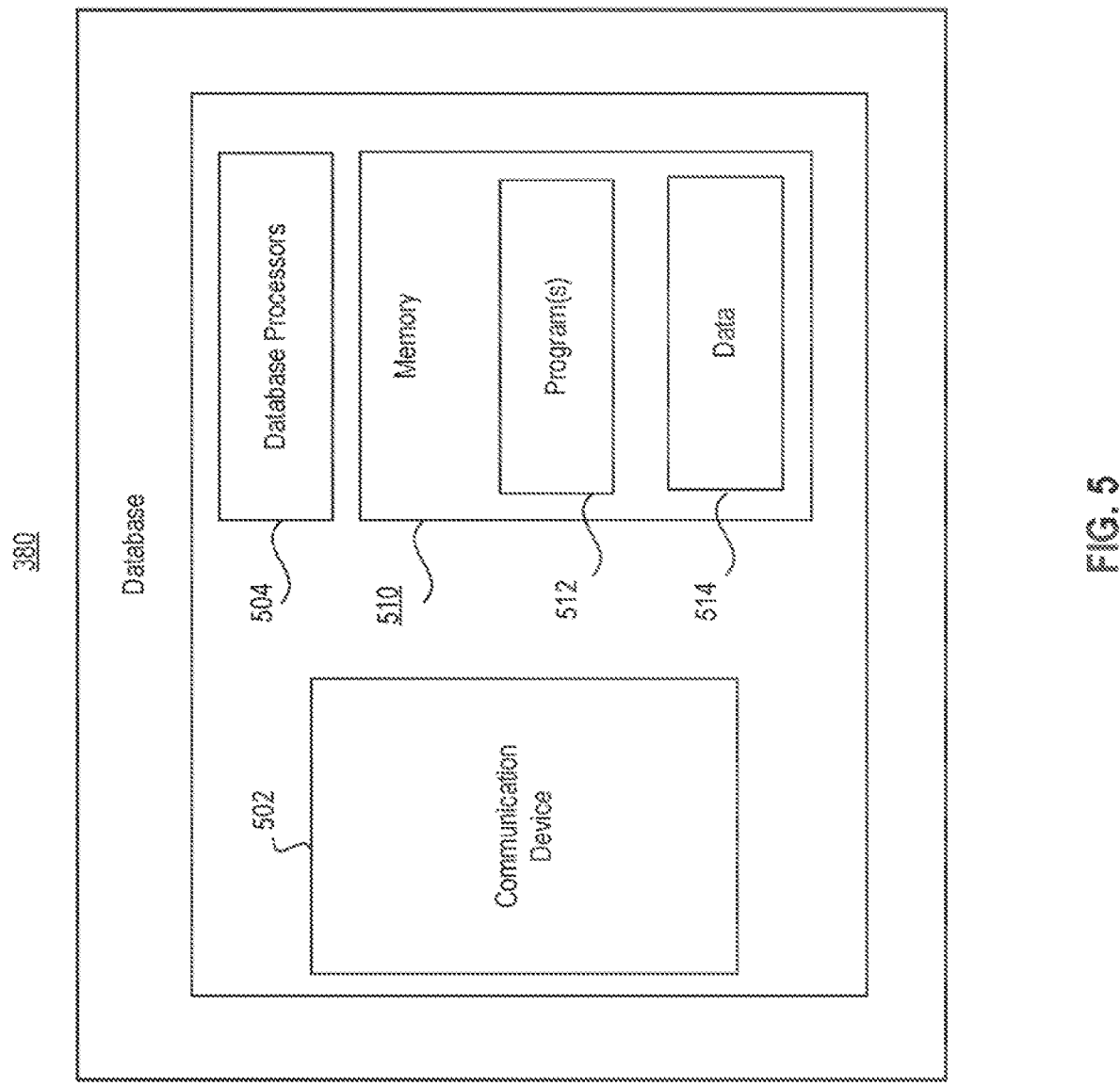
FIG. 5 is a block diagram of an exemplary database, consistent with disclosed embodiments.

Referring now to FIG. 5, there is shown a block diagram of an exemplary one of databases 380 (FIG. 3), consistent with disclosed embodiments. In some embodiments, databases 380 may be included in elements of system 100. For example, databases 380 may be part of external front-end system 103 or the WMS 119 (FIG. 1A).

Databases 380 may include a communication device 502, one or more database processors 504, and database memory 510 including one or more database programs 512 and data 514. Databases 380 may include NoSQL databases such as HBase, MongoDB™ or Cassandra™. Alternatively, databases 380 may include relational databases such as Oracle, MySQL and Microsoft SQL Server.

In some embodiments, databases 380 may be servers, general purpose computers, mainframe computers, or any combination of these components. In some embodiments, databases 380 are included within other elements of system 300, such as APN system 320. Other implementations consistent with disclosed embodiments are possible. In some embodiments, databases 380 may include both non-relational and embedded databases. For example, databases 380 may include a non-relational database, such as an Hbase, and an embedded database, such as a RocksDB (e.g., a key-value store database).

Communication device 502 may be configured to communicate with one or more components of system 300 or system 100, such as online resources 340, APN system 320, or SCM system 117. Communication device 502 may be configured to provide APN system 320 historic order information and user preferences or privileges.

The components of databases 380 may be implemented in hardware, software, or a combination of both hardware and software. For example, although one or more components of databases 380 may be implemented as computer processing instruction modules, all or a portion of the functionality of databases 380 may be implemented instead in dedicated electronics hardware.

Database memory 510 may include programs 512, which may include instructions to receive and process historic purchase data (e.g., from online resources 340). Further, database memory 510 may include instructions for communications between elements of system 300. For example, database memory 510 may include instructions for communications between client devices 350 and APN system 320 or online resources 340. Further, programs 512 may include instructions to store information in real-time, as it is processed by APN system 320.

Data 514 may also be data associated with order status, expected delivery, and target PDD. Data 514 may include, for example, information relating to previously pending orders in the system, selected fulfillment centers, or inventory status.

Figure 6:
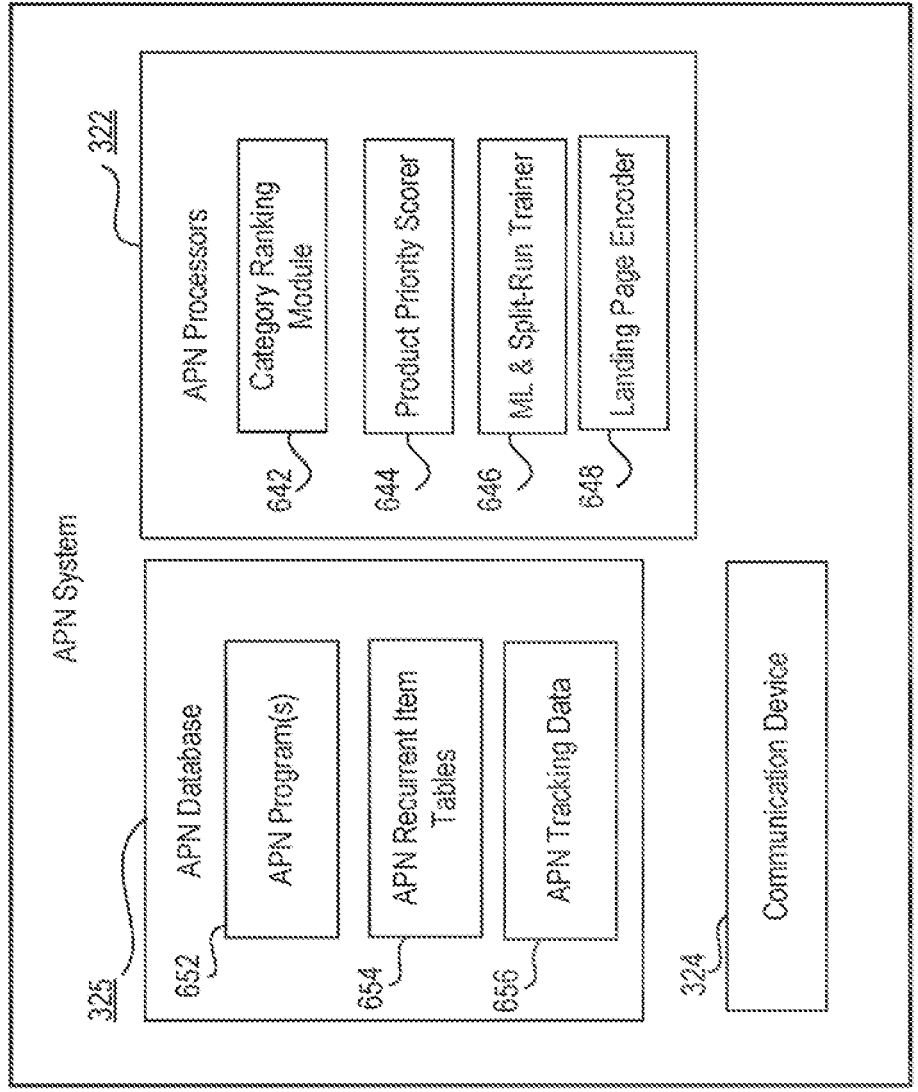
FIG. 6 is a block diagram of an exemplary adaptive push notification (APN) system, consistent with disclosed embodiments.

FIG. 6 is a block diagram of an exemplary adaptive push notification (APN) system 320 (FIG. 3), consistent with disclosed embodiments. APN system 320 may include a communication device 324, APN database 325, and one or more APN processors 322. APN database 325 may include APN programs 652, APN recurrent item tables 654, and APN tracking data 656. APN processors 322 may include a category ranking module 642, a product priority scorer 644, a machine-learning (ML) & split-run trainer 646, and a landing page encoder 648.

Communication device 324 may include a network controller and/or wireless adaptor for communicating over the Internet. Communication device 324 may be configured to communicate with one or more databases, such as databases 380 (FIG. 3) either directly, or via network 370.

APN database 325 includes one or more storage devices configured to store instructions used by APN processors 322 to perform functions related to disclosed embodiments. For example, APN database 325 may store software instructions that may configure APN processors 322 to perform operations. The disclosed embodiments are not limited to separate programs or computers configured to perform dedicated tasks. Moreover, APN database 325 may store cyclical or lock-in content for push notification that allows automated selection of content for push notification. Further APN database 325 may also store and automatically maintain lists of client IDs associated with products IDs, personalized priority scores, and life cycle timers. For example, APN database 325 may include APN recurrent item tables 654 that store tables of products indexed by category ID and product ID. As further disclosed in connection with FIG. 9, the tables of products for push notifications may also specify a priority score or rank (indicating the priority for push notification reminder) and a lifecycle timer (indicating how often a client purchases the product) for each one of the products. In some embodiments, the priority scores and lifecycle timers may be generated individually for each client based on, for example, historic purchases and/or client preferences. As further described in connection with FIG. 11, APN recurrent item tables 654 may get updated based on tracking information, computed average repurchase times, and/or manager-defined parameters through a GUI.

Moreover, APN database 325 may additionally include APN tracking data 656. APN tracking data 656 may include copies of logs from redirect servers which may be used by APN processors 322 to adjust priority scores, lifecycle timers, or re-arrange recurrent/cyclical item lists. In some embodiments, APN tracking table 656 may store encoding and decoding keys to, for example, generating encoded landing pages with tracking cookies, or tacking codes, that allow correlating visits to product websites with client ID, push notification configuration, payload message, and payload image.

In certain embodiments, APN database 325, and particularly APN programs 652, may store instructions for carrying out processes to generate lists of recurrent products for push notifications, generate priority scores and list rankings, generate encoded webpages to track user interactions, and analyze the combined data of pushed notifications and historic purchases to identify push notification configurations (in both content and delivery) that generate the greatest engagement. Other instructions are possible as well. In general, instructions may be executed by APN processors 322 to perform processes consistent with disclosed embodiments.

APN processors 322 may include one or more known processing devices, such as, but not limited to, microprocessors, CPUs, and/or multi-core processors. In other embodiments, APN processors 322 may be a plurality of devices coupled and configured to perform functions consistent with the disclosure. In some embodiments, APN processors 322 may execute software to perform functions associated with each component of APN processors 322. In other embodiments, each component of APN processors 322 may be an independent device.

Category ranking module 642 may be configured to analyze purchase information for individualizer or aggregated accounts (i.e., audience segments) and assign a ranking to product categories that aid in the selection of content for notification to client devices. Category ranking module 642 may collect purchasing history of a client and identify categories of products that are more likely than others to be repurchased than others. For example, category ranking module 642 may determine that a user buys beauty products more frequently than home repair products and thus assign a higher category ranking to the beauty category than the home improvement category. Alternatively, or additionally, category ranking module 642 may determine which category is associated with more frequent purchases. For example, category ranking module 642 may study historic purchase records of an audience segment to identify recurrent repurchases of a product, categorize the product, and assign a category ranking by identifying rankings with highest number of associated repurchased products. Moreover, as further discussed in connection with FIG. 12, category ranking module 642 may estimate repurchase averages and/or determine user affinity to categories to adjust category rankings. Moreover, in certain embodiments category ranking module 642 may collect and/or adjust ranking data based on manager-defined parameters, which may be collected from a GUI as further discussed in connection with FIG. 21.

Product priority scorer 644 may include software and/or hardware configure to assign scores to products or items in the list of recurrent items for push notification. Product priority scorer 644 may assign the scores based on likelihood of CTR, diversity of push notifications (to avoid client exhaustion), and/or collected use data of previous interactions with push notifications and/or purchasing records. In some embodiments, product priority scorer 644 may be configured to communicate with redirect servers and retrieve collect redirect logs. In such embodiments, product priority scorer 644 may leverage the redirect information to determine products that are visited at a higher rate than others and adjust priority scoring accordingly. As further discussed in connection with FIG. 13, product priority scorer 644 may be configured to both assign and modify priority scores for each product in APN database 325. For example, product priority scorer 644 may assign and/or modify priority scores of products based on: (i) when the product was added to a recurrent product list, giving higher priority scores to products which became eligible for cyclical notifications higher (2) how often the product is being ordered by the specific clients, a clustered population of similar clients, or the general push notification audience; giving higher scores to frequently purchased products; (3) how much time is left before a lifecycle timer expire; giving higher scores to products that are past a normal repurchase date; and/or (4) what is the likelihood of engagement for the product; giving a higher priority score to products with higher CTR.

In some embodiments, product priority scorer 644 may leverage the category rankings (as determined by category ranking module 642) to assign or modify product scores. For example, product priority scorer 644 may assign and/or modify priority scores based on category diversity rules. In such embodiments, product priority scorer 644 may pick the highest ranked category according to category ranking module 642 and identify a product within the category with the most frequent purchase to assign a top priority score. Product priority scorer 644 may then pick the second category in the ranking and similarly pick a product within the category that has most frequent purchases. This process, of selecting products in the order of categories and based on the repurchase frequency, may be performed for all categories and after all categories have been included in the cyclical item selection, product priority scorer may return to the highest category. By scoring products with the described cycle of categories, product priority scorer 644 generates a list of recurrent items that avoid having products of the same category pushed consecutively. This feature may improve push notification technology by facilitating automation of content generation while avoiding user fatigue.

ML & split-run trainer 646 may include computing components configured to use data in APN database 325 to generate machine-learning (ML) models that predict likelihood of engagement for push notifications. For example, ML & split-run trainer 646 may use APN tracking table 656 to generate predictive models that assign a probability for CTR. The ML models generated by ML & split-run trainer 646 may include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a Density-based spatial clustering of applications with noise (DBSCAN) model, a k-means clustering model, a distribution-based clustering model, a k-medoids model, a natural-language model, and/or another machine-learning model. Further, models may include an ensemble model (i.e., a model having a plurality of models).

In some embodiments, ML & split-run trainer 646 is configured to terminate training when a training criterion is satisfied. Training criterion may include several epochs, a training time, a performance metric (e.g., an estimate of accuracy in reproducing test data), or the like. ML & split-run trainer 646 may be configured to adjust model parameters during training. Model parameters may include weights, coefficients, offsets, or the like. Training may be supervised or unsupervised.

ML & split-run trainer 646 is configured to train ML models by optimizing model parameters and/or hyperparameters (i.e., hyperparameter tuning) using an optimization technique, consistent with disclosed embodiments. Hyperparameters include training hyperparameters, which may affect how training of a model occurs, or architectural hyperparameters, which may affect the structure of a model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like.

Further, ML & split-run trainer 646 may be configured to process split-run testing. For example, ML & split-run trainer 646 may perform bucketed or split-run testing of push notifications to evaluate their performance and identify higher CTR rates based on combinations of images and messages, as further discussed in connection with FIG. 18. In such embodiments, ML & split-run trainer 646 may be configured to collect information from redirect server, decode encoded tracking cookies, and associate visits to landing pages with a specific configuration of push notification (e.g., a specific image/message combination) and perform statistical analysis to identify combinations of images and messages that generate the best engagement or CTR.

Landing page encoder 648 may include software and/or hardware configured to encode URLs, landing pages, and/or tracking codes to facilitate the evaluation of push notifications. For example, landing page encoder 648 may include software for URL encoding configured to convert characters into a format that can be transmitted over the Internet. In some embodiments, landing page encoder 648 may include an ASCII format converter and perform functions such as encodeURIComponent( ). Additionally, or alternatively, landing page encoder 648 may generate and string Urchin Tracking Module (UTM) codes to URLs to generate traceable landing pages and/or accommodate tracking cookies. For example, landing page encoder 648 may generate snippets of text that may be added to the end of a URL to help tracking traffic based on the URL. In such embodiments, landing page encoder 648 may customize UTM codes to match the webpage that gets linked. In some embodiments landing page encoder 648 may encode tailored or customized URLs that include information associated with a campaign. For example, landing page encoder 648 may perform URL building operation that specify UTM codes for source, medium, campaign, term, and content. Moreover, landing page encoder 648 may encode client information, product information, and tracking cookie information as UTM codes.

Furthermore, landing page encoder 648 may configure the landing pages to be redirected by a redirect server to a product page. For example, landing page encoder 648 may encode URLs that trigger redirection by a redirection server to a landing page such as the SDP described in FIG. 1C. For example, landing page encoder 648 may configure URLs that, in addition to include tracking and identification codes, cause redirection in a Single Display Page (SDP) such as the one described in connection with FIG. 1C. Thus, in such embodiments, landing page encoder 648 may coordinate redirection instruction in redirect servers and the configuration of encoded landing pages and URLs to direct clients to specific product pages.

Figure 7:
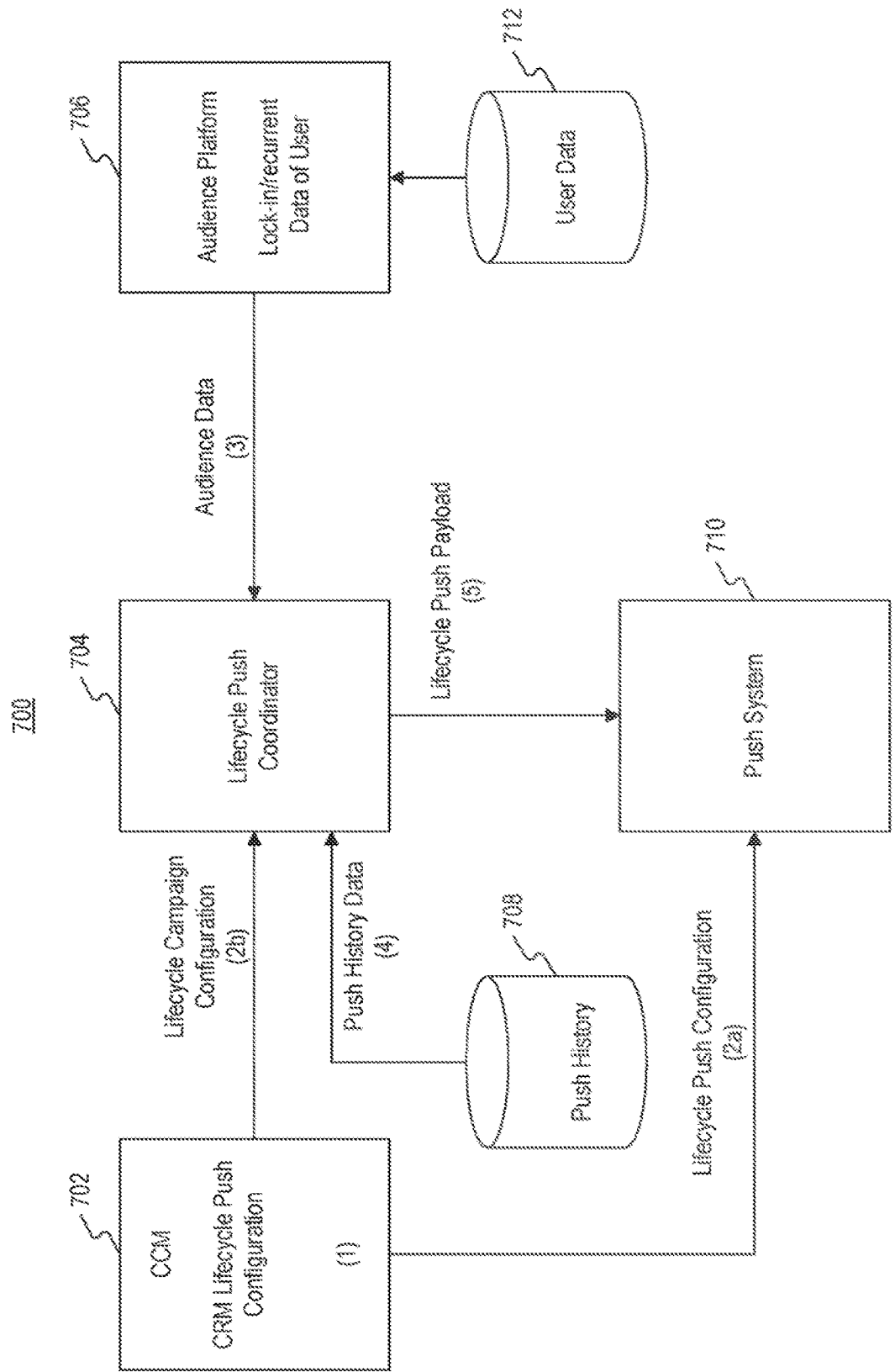
FIG. 7 is a block diagram of an exemplary electronic notification delivery system, consistent with disclosed embodiments.

FIG. 7 is a block diagram of an exemplary push notification delivery system 700, consistent with disclosed embodiments. System 700 may include a customer relationship manager (CRM) push configuration 702, a lifecycle push coordinator 704, an audience platform 706, and a push system 710. These modules of system 700 may be coupled with databases, such as push history DB 708 and user data DB 712. Push history DB 708 may include push history data, such as previous notifications sent to client devices, the push notification configuration and the response or click through rate that they achieved. User data DB 712, may include history of purchases by client in the platform that may be used to identify periodic purchases, preferred items, and/or tentative products that the client may purchase in the future. In some embodiments, system 700 may be implemented, or be part of, APN system 320 and/or system 300. In other embodiments, system 700 may be independent from system 300.

CRM push configuration 702 may include systems that identify, configure, or receive input of campaign parameters. For example, CRM push configuration 702 may receive lifecycles and/or campaign parameters from an operator. For example, CRM push configuration 702 may generate GUIs that interact with operators (such as the GUI described in connection with FIG. 21) to facilitate programing of lifecycle push configurations and/or the selection of categories. Additionally, or alternatively, CRM push configuration 702 may receive campaign parameters from an operator that program variables, such as selecting categories that should be prioritized, maximum number of notifications per category, initial priority scores, and or product categorizations. CRM push configuration 702 may also enable scripting and/or programming of campaign parameters to facilitate an automated way to generate recurrent or lock-in products and categories. For instance, in some embodiments, CRM push configuration 702 may allow programming of lifecycle campaigns parameters. Further, CRM push configuration 702 may collect or generate metadata selecting the lock-in categories and determine relative ranks of the categories. Moreover, in some embodiments CRM push configuration 702 may set repetition variables, which may be automated to minimize user fatigue, or manually determined based on campaign goals. For instance, CRM push configuration 702 may determine how many repeat push notification per lock-in product and how after how many days the product can be repeated.

As shown in FIG. 7, CRM push configuration 702 may communicate with lifecycle push coordinator 704. Lifecycle push coordinator 704 may receive campaign data from CRM push configuration 702 periodically and/or automatically. In some embodiments, lifecycle push coordinator 704 may automate push notification processes based on information from CRM push configuration 702 and the push history from push history DB 708. In such embodiments, lifecycle push coordinator 704 may configure and run programs for automated generation of lists of users and their corresponding lock-in products. For example, lifecycle push coordinator 704 may generate lists of users for a campaign based on audience data received from audience platform 706. Further, lifecycle push coordinator 704 may also run and configure programs for algorithmic ranking of eligible lock-in product for push notification to optimize user's engagement. Moreover, in some embodiments lifecycle push coordinator 704 may maintain and monitor perpetual lifecycle campaigns with changing products or categories but a persistent notification frequency.

Audience platform 706 may maintain data structures that correlate client IDs, products, and categories of the products. Further, audience platform 706 may generate lists of eligible users and the associated lock-in products. In some embodiments, after collecting data from CRM push configuration 702, push history DB 708, and audience platform 706, lifecycle push coordinator 704 may program and generate notification payloads. For example, lifecycle push coordinator 704 may identify images to include in the payloads of push notifications, program personalized messages, and encode URLs (as further described in connection with FIG. 6) to prepare messages for push notification.

Push system 710 may receive the push configuration from CRM push configuration 702 and push payload from lifecycle push coordinator 704 and push the notification to client devices. For example, push system 710 may utilize APIs to coordinate delivery of messages through push notification. In some embodiments, push system 710 may communicate and/or interact with notification services, such as Apple Push Notification service (APNS) or Google Cloud Messaging (GCM).

Figure 8:
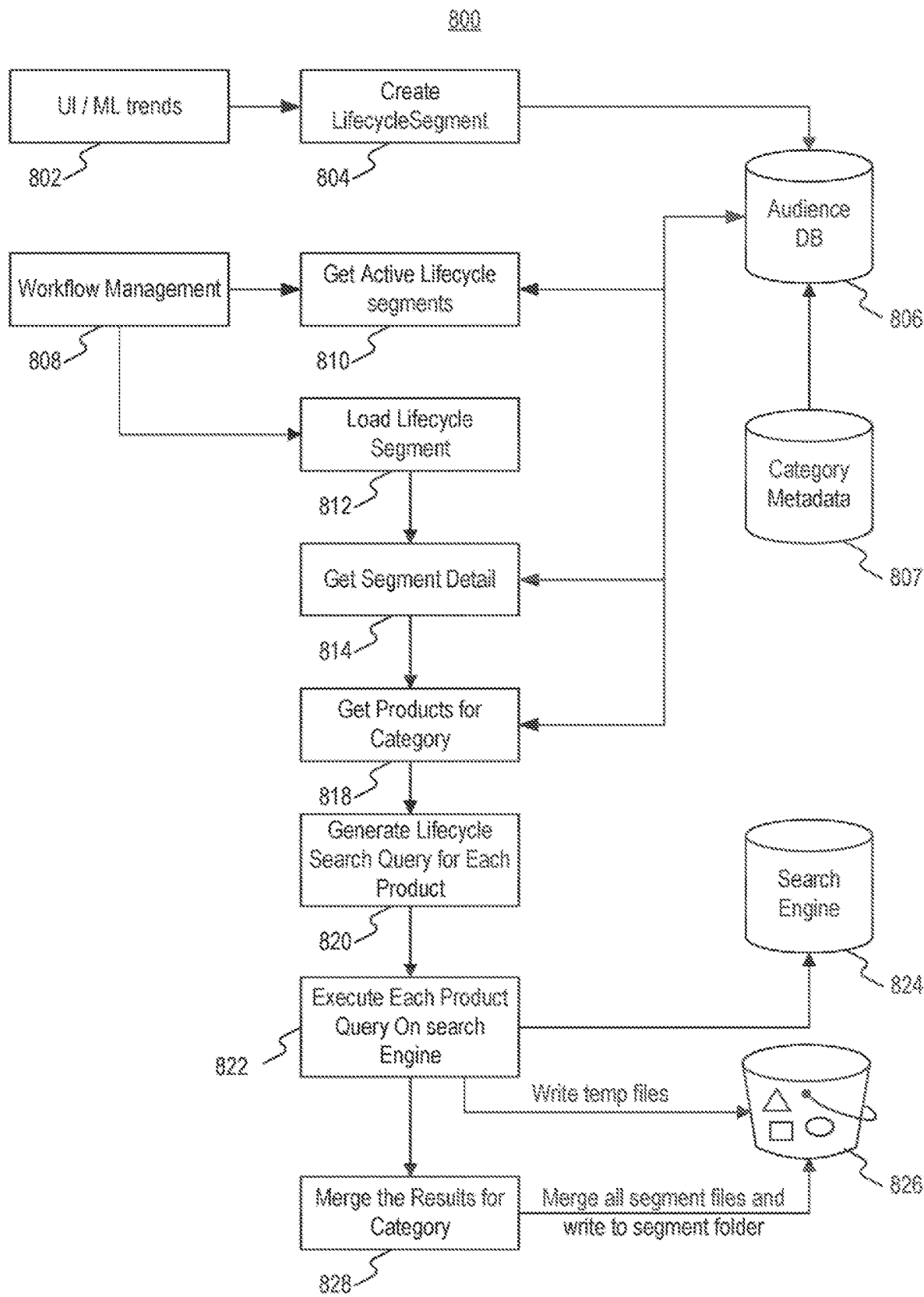
FIG. 8 is a flow diagram of an exemplary process for identifying and ranking recurrent products eligible for electronic notification, consistent with disclosed embodiments.

FIG. 8 is a flow diagram of an exemplary process 800 for identifying and ranking recurrent products eligible for electronic notification, consistent with disclosed embodiments. In some embodiments, elements of system 300 may perform process 800. For example, as disclosed in the steps description below, APN system 320 may perform process 800. Alternatively, or additionally, online resources 340 may perform process 800, or parts of process 800. Further, in other embodiments system 100, or parts of system 100, may perform process 800. For instance, external front end system 103 and/or SAT 101 may perform process 800.

In step 802, APN system 320 may collect or generate campaign goals, categorization parameters, and/or lists of products for notification. For example, APN system 320 may request or retrieve campaign goals from a campaign operator using a graphical user interface, like the one described in connection with FIG. 21. Alternatively, or additionally, in step 802 APN system 320 may employ ML models to identify products and categories that should be considered for asynchronous or push notification. For example, APN system 320 may use models generated by ML & split-run trainer 646 (FIG. 6) to identify products that are purchased periodically by a cluster of users. In such embodiments, APN system 320 may identify products that are periodically purchased by users in a zip code. Thus, in step 802 APN system 320 may identifying trends, common searches, or purchase parameters to generate product lists of likely recurrent or lock-in products.

In step 804, APN system 320 may create a lifecycle segment. For example, based on the campaign goals, categorization parameters, and list of products from step 802, APN system 320 may determine an audience segment that can enter a lifecycle campaign. In some embodiments, the selection of the lifecycle segment may generate lists of users that are eligible for asynchronous and/or push notifications. APN system 320 may also store the lifecycle segment in an audience database in step 806. The audience database of step 806 may store clients and their related lifecycle segment (i.e., their associated cluster) for notification of recurrent products. Additionally, as shown in FIG. 8, an audience database may be in communication with a category metadata database. In such embodiments, in step 807 the audience database may receive category metadata to associates audience segments with specific categories or specific prioritization of categories.

With lifecycle segments created and associated with client devices in audience database, in step 808 APN system 320 may initiate a workflow evaluation to find eligible products for a specific user (or user segments) and the adequate time to send the push notification—or other form of asynchronous communication. In step 808, APN system 320 may use a workflow management platform to determine and characterize notifications exchanged in the system. For example, APN system 320 may use Apache Airflow to characterize system notifications. Alternatively, or additionally, in step 808 APN system may interface with web services, like Google Cloud Messaging (GCM), to identify the status of workflows and notifications to client devices.

In step 810, APN system 320 may query the audience database, which stores the lifecycle segments, to identify active lifecycle segments. For example, APN system 320 may query the database to determine which users have opted-in to receiving push notifications and whether there are products in a list for push notification that can be communicated to the client.

In step 812, APN system 320 may load a selected lifecycle segment. For example, APN system 320 may identify a specific segment of the audience for push notification. In step 814, APN system 320 may query the audience database to get segment details. For instance, in step 814 APN system 320 may identify products that are likely to generate greatest CTR and that can be transmitted to client devices in the segment. In step 818, APN system 320 may get product categories that have a higher probability to generate an interaction during asynchronous communication.

Using the segment details and product categories, in step 820 APN system 320 may generate a lifecycle search query for each one of the products that may be interested to users in lifecycle segment. For example, APN system 320 may determine that clients in zip codes of rural areas have a higher CTR for farm related products and generate lifecycle search query for the related products. Alternatively, or additionally, APN system 320 may generate lifecycle search queries for products based on past user purchases and/or clustering based on the user previous on-line behavior, searches, or purchased products. In step 822, APN system 320 may execute the product queries on a search engine. For example, APN system 320 may transmit a search query request to a search engine in step 824. The search query may request product IDs, images, and SPDs for the products identified in audience database and based on the selected segments.

Moreover, in step 826 APN system 320 may write temporal files based on the product query and/or the results of search engine. In step 828, APN system 320 may merge results for each category with segments to prepare for asynchronous notifications. For example, in step 828 APN system 320 may generate an item list for notifications to a client ID. The item list may be indexed based on category IDs and product IDs (as determined in steps 802-806) and where the items in the item list have an associated priority score and lifecycle timer. As further discussed in connection with FIG. 13, the priority scores may be based on a plurality of factors and score adjustments. The lifecycle timers may be based on a median and/or average frequency of purchase for the recurrent or lock-in items.

FIG. 9 shows exemplary tables of ranked categories and products based on priority scores and lifecycle timers, consistent with disclosed embodiments. FIG. 9 shows a category table 910 and a product table 920.

Category table 910 shows a table with multiple categories 918, which may be defined by, for example, CRM push configuration 702 (FIG. 7). Category table 910 may specify a category 912, a category rank 914, and product IDs 916 that are associated with each of the categories. As shown in FIG. 9, category table 910 may include categories such as baby products, beauty products, and detergent products (among others). Each of these categories 918 may be assigned a ranking. In some embodiments, the ranking may be assigned by, or based on input from, a campaign operator. For example, an operator may use a GUI, like the one described in connection with FIG. 21, to specify the rankings of each category. Alternatively, or additionally, the category rankings may be set for individual users. For example, based on historic purchases, audience segmentation, search trends, or user preferences, the category rankings may be set or adjusted based on ML or split-run models. For example, ML models may identify categories with higher CTR and modify scores assigned by a campaign operator to assign higher scores to categories with highest CTR. Product IDs 916 may specify the different products that are assigned to the category. Product IDs 916 may include product codes that get encoded in URLs. For example, as further discussed in connection with FIG. 6, landing page encoder 648 may encode product IDs 916 and category 912 in landing page URLs to enable tracking of user interaction with push notifications and/or other forms of asynchronous notifications.

Product table 920 may sort products based on delivery rules that enable automatic content selection (e.g., to build the push notification payload) and enhance the variety of pushed content. Product table 920 may be generated specifically for each user in the audience (e.g., based on the user's online behavior) and lists a plurality of items 926 indexed based on both category IDs (from category 912) and product IDs (from product IDs 916). Thus, each one of the items in product table 920 may be indexed by both category and product. This multi-variable indexing allows APN system 320 to create lists that maximize diversity while accounting for highest likelihood of engagement. For instance, each one of the items 926 may be assigned a push notification rank 924 that may be based on a priority score assigned to item (e.g., based on a likelihood on engagement) and a category diversity. In such embodiments, product table 920 may sort items 926 based on rules such as minimizing category repeats by assigning higher rankings to one product from each category before assigning a second product of the same category. Further, the organization in product table 920 may include prohibiting products from the same category being placed consecutively in product table 920, unless there are no other categories to select from.

The combination of category table 910 and product table 920 may facilitate the use selection of content for push notification by creating a system and/or data structures that allow automated selection of content based on CTR likelihood and diversity of recurrent push notifications. Such configuration may enable to enhance user engagement with electronic notifications and solve problems of electronic notification overload by automating the determination of opportune time for delivery and/or the selection of relevant content.

Figure 10:
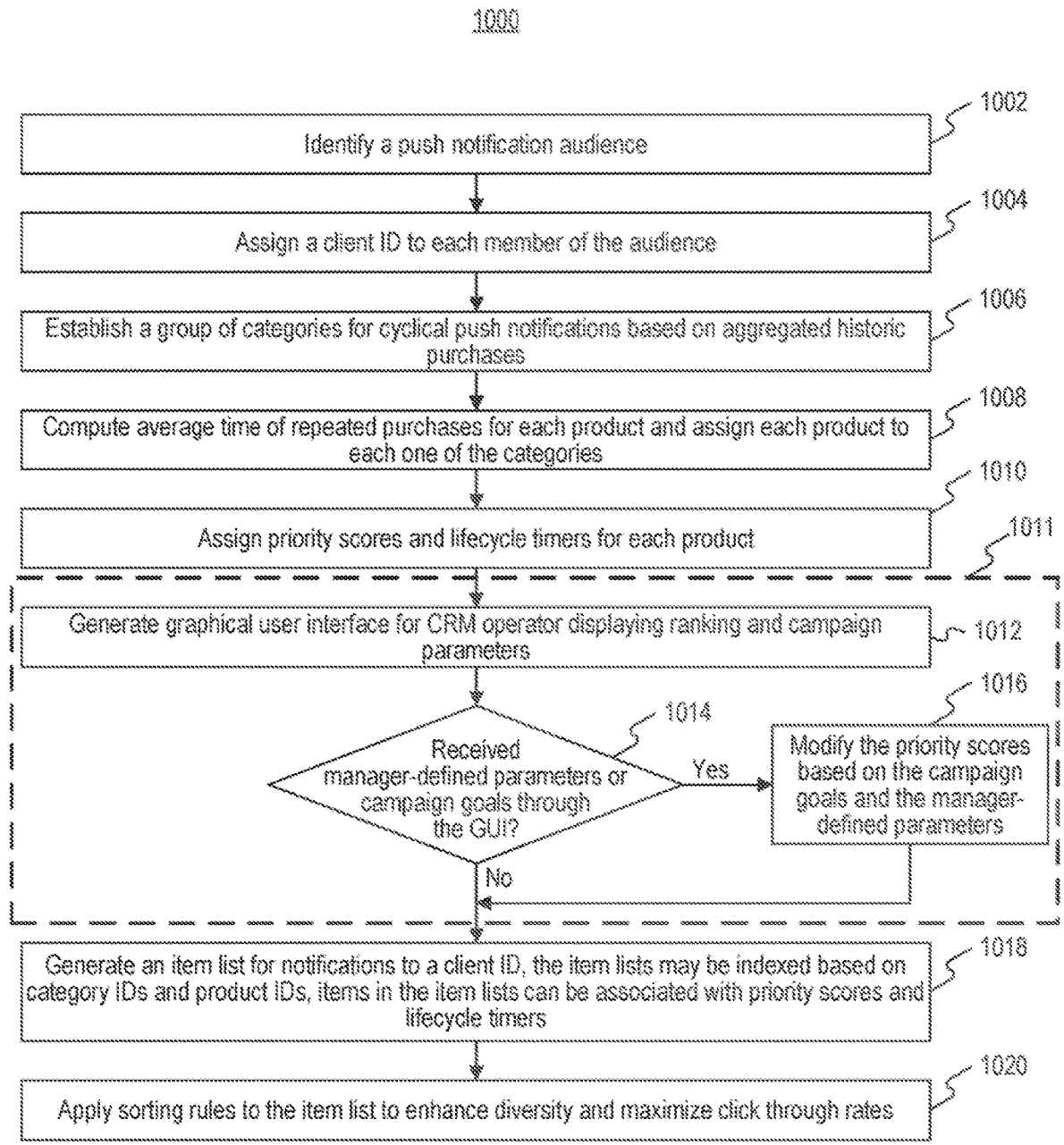
FIG. 10 is a flow chart of an exemplary process for generating a list of recurrent items for push notification, consistent with disclosed embodiments.

FIG. 10 is a flow chart of an exemplary process 1000 for generating a list of recurrent items for push notification, consistent with disclosed embodiments. In some embodiments, elements of system 300 may perform process 1000. For example, as disclosed in the steps description below, APN system 320 may perform process 1000. Alternatively, or additionally, online resources 340 (FIG. 3) may perform process 1000, or parts of process 1000. Further, in other embodiments system 100 (FIG. 1), or parts of system 100, may perform process 1000. For instance, external front end system 103 and/or SAT 101 may perform process 1000.

In step 1002, APN system 320 may identify a push notification audience. For example, as further disclosed in connection with FIG. 8, based on inputs in a UI and or trend evaluation using ML models, APN system 320 may identify a push notification audience or a lifecycle segment that gets stored in an audience database. In some embodiments, the push notification audience may be based on user opt-in/opt-out selections. Alternatively, or additionally, APN system 320 may identify the notification audience based on past purchases.

In step 1004, APN system 320 may assign client IDs to each member of the audience. With the purpose of facilitating selection of targeted content and tracking client engagement with notifications, APN system 320 may assign a client ID to each member of the audience and store the assigned client IDs in, for example, databases 380.

In step 1006, APN system 320 may establish a group of categories for cyclical push notifications based on aggregated historic purchases. For example, based on historic purchases and/or trends of users in the audience (from step 1002) APN system 320 may identify certain categories that are likely to have periodic purchases. In some embodiments, APN system 320 may employ ML models to determine the categories for cyclical push notifications. Additionally, or alternatively, the categories for cyclical push notification may be selected by a campaign operator (e.g., through a category ranking GUI like the one described in FIG. 21) or based on user preferences and selections.

In step 1008, APN system 320 may compute average time of repeated purchases for each product and assign each product to each one of the categories. For example APN system 320 may identify products that are likely to be purchased periodically, assign them to one of the categories for cyclical push notification, and calculate an average time of repurchase. For example, APN system 320 may identify that bananas are purchased by members of the audience with certain periodicity. APN system 320 may then assign bananas to a product category (e.g., fruits category) and calculate the average time between repeated purchases. For example, APN system 320 may determine that the average time between purchases of bananas is one week. A similar process may be performed for other products and other categories in step 1008.

In step 1010, APN system 320 may assign priority scores and lifecycle timers for each product. APN system 320 may assign a priority score to each one of the products that is based on how often a user purchases a product, the product cost, the product normal availability, and/or purchasing trends. Further, APN system 320 may assign lifecycle timers to each one of the products based on the average time between repeated purchases estimated in step 1008. In some embodiments, to assign priority scores APN system 320 may perform operations of (1) assigning initial priority scores based on previous purchases associated with the client ID, (2) increasing the priority scores of items with higher ranked product categories, (3) increasing the priority scores based on an inclusion function that increases the priority scores of items recently included in the item list, (4) increasing the priority scores proportionally to a number of times the client ID has ordered the product, and (5) decreasing the priority scores proportionally with respective ones of the lifecycle timers. Moreover, in some embodiments APN system 320 may assign the lifecycle timers associated to each product so it is equal to average times.

In steps 1011, APN system 320 may collect operator and/or campaign manager preferences to customize the priority scores and lifecycle timers associated with the products. As shown in FIG. 10, steps 1011 may include step 1012, step 1014, and step 1016. These steps 1011, however, are optional and may be omitted in embodiments that do not use operator preferences and/or metrics. For example, process 1000 may move from step 1010 to step 1018 directly, without performing steps 1011. In other embodiments, as discussed below, APN system 320 may perform steps 1011 to collect operator preferences and use them to tailor priority scores and lifecycle timers.

In such embodiments, in step 1012 APN system 320 may generate a GUI for a CRM operator displaying ranking and campaign parameters. To easily capture modifications or specific campaign goals, APN system 320 may generate and display a GUI, like the one described in FIG. 21, that allows an operator to adjust rankings, products, or audiences. In some embodiments, APN system 320 may generate a pre-populated interface adjustable by a user. In such embodiments, APN system 320 may enforce certain rules on the campaign or category changes. For example, an operator may not exceed a maximum number of pushes or may not modify category ranks that have been selected based on having higher CTR and/or predicted trends.

In step 1014, APN system 320 may determine whether it received manager-defined parameters or campaigns goals through the GUI. For example, APN system 320 may determine whether an operator made any changes to default values in a GUI. If APN system 320 determines it received manager-defined parameters or campaigns goals (step 1014: Yes), APN system 320 may continue to step 1016 and modify the priority scores of products (and the ranking of categories) based on the campaign goals and the manager-defined parameters. But, if APN system 320 determines it did not receive manager-defined parameters or campaigns goals (step 1014: No), APN system 320 may skip step 1016 and continue to step 1018.

In step 1018, APN system 320 may generate an item list for notifications to a client ID. As discussed in connection with FIG. 9, the item list may be indexed based on category IDs and product IDs. And each one of the items in the item list may be associated with priority scores and lifecycle timers, as assigned in step 1010. In some embodiments, APN system 320 may generate the item list by identifying, from a database, products that are ordered periodically and assigning the product IDs. APN system 320 may then categorize the products in product categories and assigning the category IDs, calculate average times between repeat purchases of the products, rank each one of product categories by determining a category affinity, and assigning higher rankings to the product categories with smallest average times.

In step 1020, APN system 320 may apply sorting rules to the item list to enhance category diversity and maximize click through rates. For example, as discussed in connection with FIG. 9, APN system 320 may apply rules to avoid products of the same category being transmitted sequentially to a user. Further, APN system 320 may modify scores and/or lifecycle timers based on ML model predictions of greater likelihood of CTR (e.g., increasing the score of products with an associated higher CTR).

Figure 11:
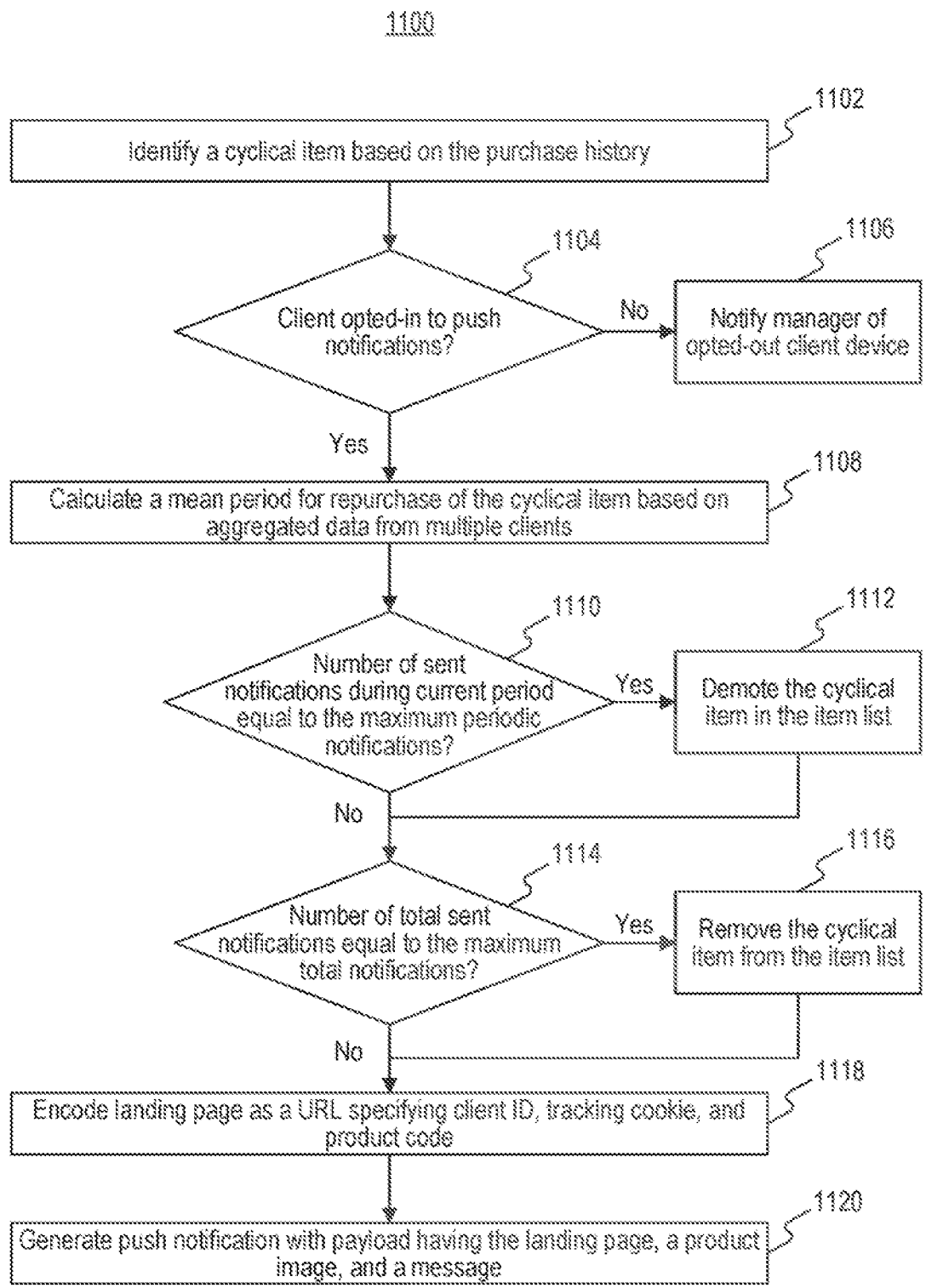
FIG. 11 is a flow chart of an exemplary process for transmitting a push notification of a recurrent and/or cyclical item to a client device, consistent with disclosed embodiments.

FIG. 11 is a flow chart of an exemplary process 1100 for transmitting a push notification of a recurrent and/or cyclical item to a client device, consistent with disclosed embodiments. In some embodiments, elements of system 300 may perform process 1100. For example, as disclosed in the steps description below, APN system 320 may perform process 1100. Alternatively, or additionally, online resources 340 may perform process 1100, or parts of process 1100. Further, in other embodiments system 100, or parts of system 100, may perform process 1100. For instance, external front end system 103 and/or SAT 101 may perform process 1100. Further, in some embodiments, process 1100 may follow process 1000. In other embodiments, process 1100 may be independent of process 1000.

In step 1102, APN system 320 may identify a cyclical item based on the purchase history. For example, APN system 320 may identify a recurrent item that is being repurchased frequently by the lifecycle or audience segment. In some embodiments, APN system 320 may identify an item from product table 920 and/or category table 910 (FIG. 9) based on priority scores, lifecycle timers, and rank for push notification 924.

In step 1104, APN system 320 may determine whether the user opted-in to push notifications. If APN system 320 determine the user did not opt for notification (step 1104: No), APN system 320 may continue to step 1106 and notify manager of opted-out client device. However, if APN system 320 determines the client opted-in to push notifications (step 1104. Yes), APN system 320 may continue to step 1108 and calculate a mean period for repurchase of the cyclical item based on aggregated data from multiple clients. For example, in step 1108 APN system 320 may determine the average time between repurchases of the cyclical item identified in step 1102.

In step 1110, APN system 320 may determine whether the number of sent notifications during a period is equal to the maximum periodic notifications. For example, APN system 320 may consult push history DB 708 (FIG. 7) to determine the number of sent notifications during a time period. If APN system 320 determines the number of sent notifications during a period is equal to the maximum periodic notifications (step 1110: Yes), APN system 320 may continue to step 1112 and demote the cyclical item in the item list. For example, if the number of maximum periodic notification is met, it may be desirable to avoid resending the same product and APN system 320 may rearrange the list of items for notification to move to a different item that has not achieved the maximum number of notifications. But if APN systems determines the number of sent notifications during a period is not equal, or below, to the maximum periodic notifications (step 1110: No), APN system 320 may continue to step 1114.

In step 1114, APN system 320 may determine whether the number of total sent notifications equal to the maximum total notifications. For example, APN system 320 may consult push history DB 708 to determine the total number of sent notifications. If APN system 320 determines the total number of sent notifications is equal to the maximum total notifications (step 1114: Yes), APN system 320 may continue to step 1116 and remove the cyclical item from the item list. In such scenarios, APN system 320 may conclude that despite multiple notifications the client has not engaged and remove the cyclical item from the item list. However, if APN system 320 determines the total number of sent notifications is not equal, or below, to the maximum total notifications (step 1114: No), APN system 320 may continue to step 1118.

In step 1118, APN system 320 may encode landing page(s) as a URL specifying client ID, tracking cookie, and product code. For example, as discussed in connection with FIG. 6, landing page encoder 648 (FIG. 6) may encode a URL with the client ID (assigned at step 1004), a tracking cookie (e.g., a UTM code), and a product (e.g., based on the category product IDs 922).

In step 1120, APN system 320 may generate push notification with payload having the landing page, a product image, and a message. As further discussed in FIG. 22, APN system 320 may include a payload that includes a parametrized message, an image of a product, and the encoded landing page or URL of step 1118. In some embodiments, as further discussed in connection with FIG. 18, the selection of images and messages may be based on results of split-run testing to identify images or messages with highest CTR.

Figure 12:
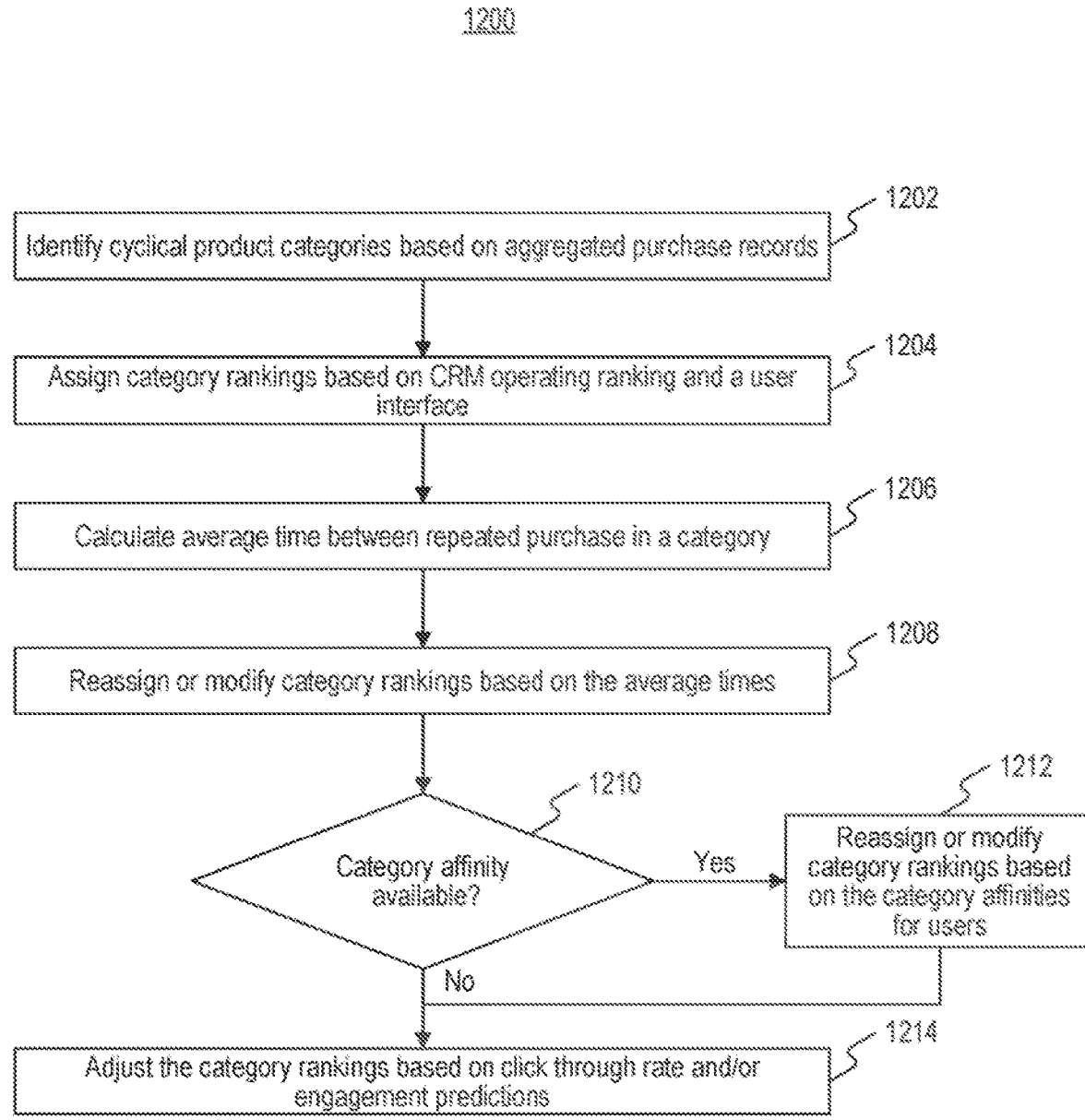
FIG. 12 is a flow chart of an exemplary process for ranking categories of recurrent and/or cyclical items scheduled for push notification, consistent with disclosed embodiments.

FIG. 12 is a flow chart of an exemplary process 1200 for ranking categories of recurrent and/or cyclical items scheduled for push notification, consistent with disclosed embodiments. In some embodiments, elements of system 300 may perform process 1200. For example, as disclosed in the steps description below, APN system 320 may perform process 1200. Alternatively, or additionally, online resources 340 or computer clusters 390 may perform process 1200, or parts of process 1200. Further, in other embodiments system 100, or parts of system 100, may perform process 1200. In some embodiments, process 1200 may be part of process 1000. For example, certain steps process 1200 may be performed as part of step 1010. In other embodiments, process 1200 may be independent from process 1000.

In step 1202, APN system 320 may identify cyclical or lock-in product categories based on aggregated purchase records. For example, APN system 320 may identify recurrent items that are repurchased frequently an audience segment. In some embodiments, APN system 320 may identify an item from product table 920 and/or category table 910 (FIG. 9) based on priority scores, lifecycle timers, and rank for push notification 924.

In step 1204, APN system 320 may assign category rankings based on CRM operating ranking and a user interface. For example, based on campaign goals and/or manager-defined parameters, APN system 320 may assign rankings to the product categories. In step 1206, APN system 320 may calculate an average time between repeated purchase in the identified categories.

In step 1208, APN system 320 may reassign or modify category rankings based on the average times. For example, if average times in a category are long (meaning that time to repurchase is usually long), APN system 320 may reduce the ranking of the category because it means that users are not frequently buying products of the category and there is a likelihood of lower CTR for the category. Alternatively, low ranked categories that have low average times may be ranked higher because notifications associated with the ranking may generate greater engagement.

In step 1210, APN system 320 may determine whether a category affinity is available for the user. For example, APN system 320 may analyze user purchase history or online searches to determine if a use is more likely to buy baby products than beauty products. Alternatively, or additionally, APN system 320 may generate ML predictions using a model that evaluates multiple parameters associated with a user to determine a category affinity for each one of the users.

If APN system 320 determines a category affinity is available (step 1210: Yes), APN system 320 may continue to step 1212 and reassign category rankings based on the category affinities of specific users. However, if the category affinity is not available, APN system 320 may continue to step 1214.

In step 1214, APN system 320 may adjust the category rankings based on click-through-rate (CTR) and/or engagement predictions. For example, APN system 320 may review logs of a redirect server to determine CTR associated with the categories. Based on recorded CTRs, APN system 320 may adjust the category rankings to give a higher ranking to categories with higher CTR.

Figure 13:
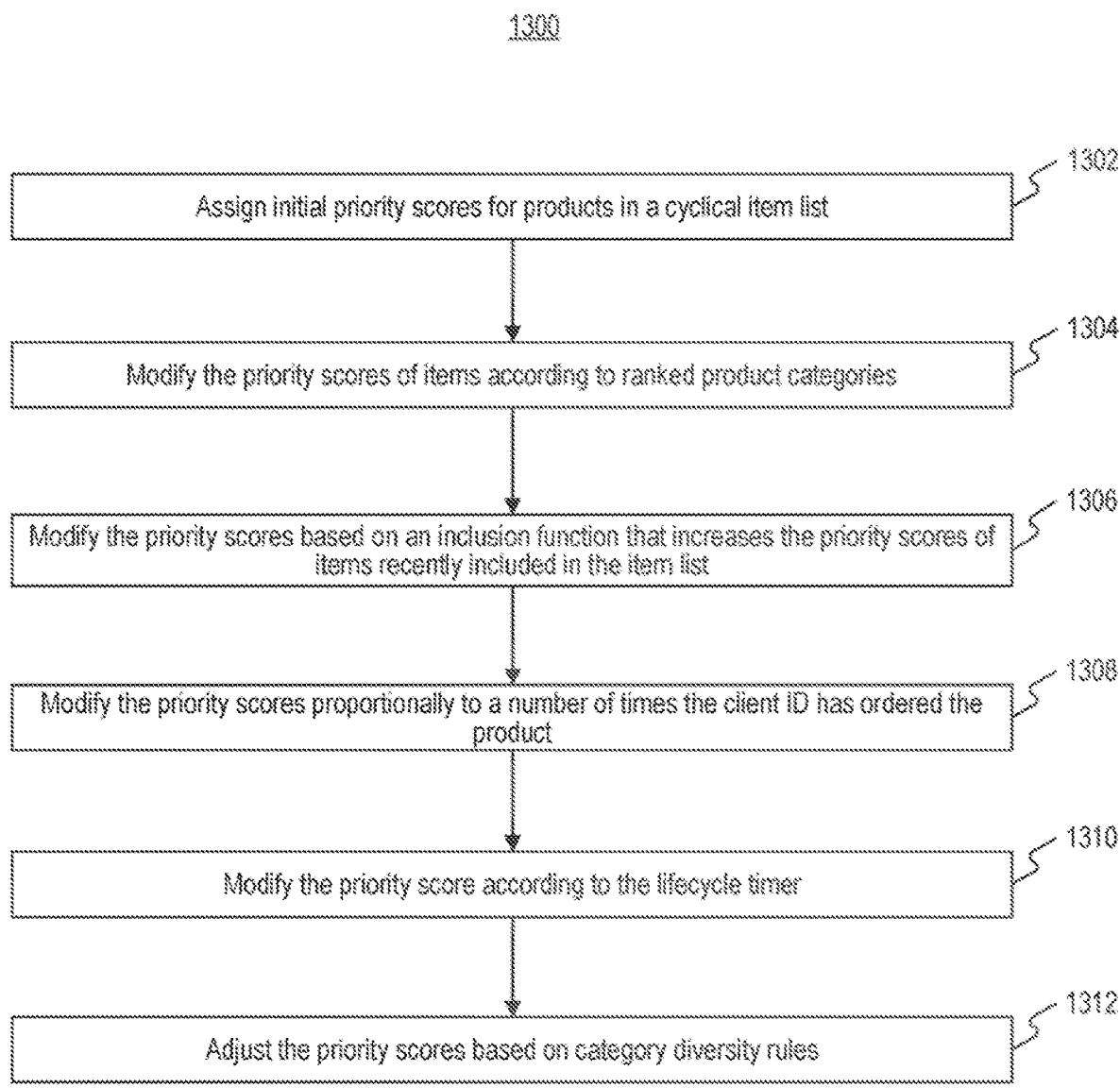
FIG. 13 is a flow chart of an exemplary process for adjusting priority scores of recurrent and/or cyclical items scheduled for push notification, consistent with disclosed embodiments.

FIG. 13 is a flow chart of an exemplary process 1300 for adjusting priority scores of recurrent and/or cyclical items scheduled for push notification, consistent with disclosed embodiments. In some embodiments, elements of system 300 may perform process 1300. For example, as disclosed in the steps description below, APN system 320 may perform process 1300. Further, in other embodiments system 100, or parts of system 100, may perform process 1300. For instance, SOT 111 and/or SAT 101 may perform process 1300. In some embodiments, process 1300 may be part of process 1000. For example, certain steps process 1300 may be performed as part of step 1010. In other embodiments, process 1300 may be independent from process 1000.

In step 1302, APN system 320 may assign initial priority scores for products in a cyclical item list. For example, APN system 320 may assign initial scores to products identified as recurrent or lock-in products in step 1008. The initial score may be based on historic data and/or campaign goals. In step 1304, APN system 320 may modify the priority scores of items according to ranked product categories. For example, after categories are ranked in process 1200, APN system 320 may modify priority scores so products in higher ranked categories receive a higher score.

In step 1306, APN system 320 may modify the priority scores based on an inclusion function that increases the priority scores of items recently included in the item list. To give greater priority to items recently included in the recurrent product list (either by user or through purchase analysis), APN system 320 may use an inclusion function that times for how long an item has been part of the recurrent list and gives a greater score when a timer is fresh or has not expired. The inclusion function may be configured as, for example, InclusionScore=InclusionBonus−Timer(n, self-.timerExpired), where it may be an initial count and self-.timerExpired may be set to be equal to the InclusionBonus. In step 1308, APN system 320 may modify the priority scores proportionally to a number of times the client ID has ordered the product.

In step 1310, APN system 320 may modify the priority score according to the lifecycle timer. For instance, APN system 320 may reduce the priority score of items with long lifecycle timers and increase the priority score of items with short lifecycle timers. In step 1312, APN system 320 may adjust the priority scores based on category diversity rules. For example, APN system 320 may evaluate a group of highest scoring products and if the highest scoring products overrepresent one of the categories, APN system 320 may adjust priority scores of products to enhance diversity between products.

Figure 14:
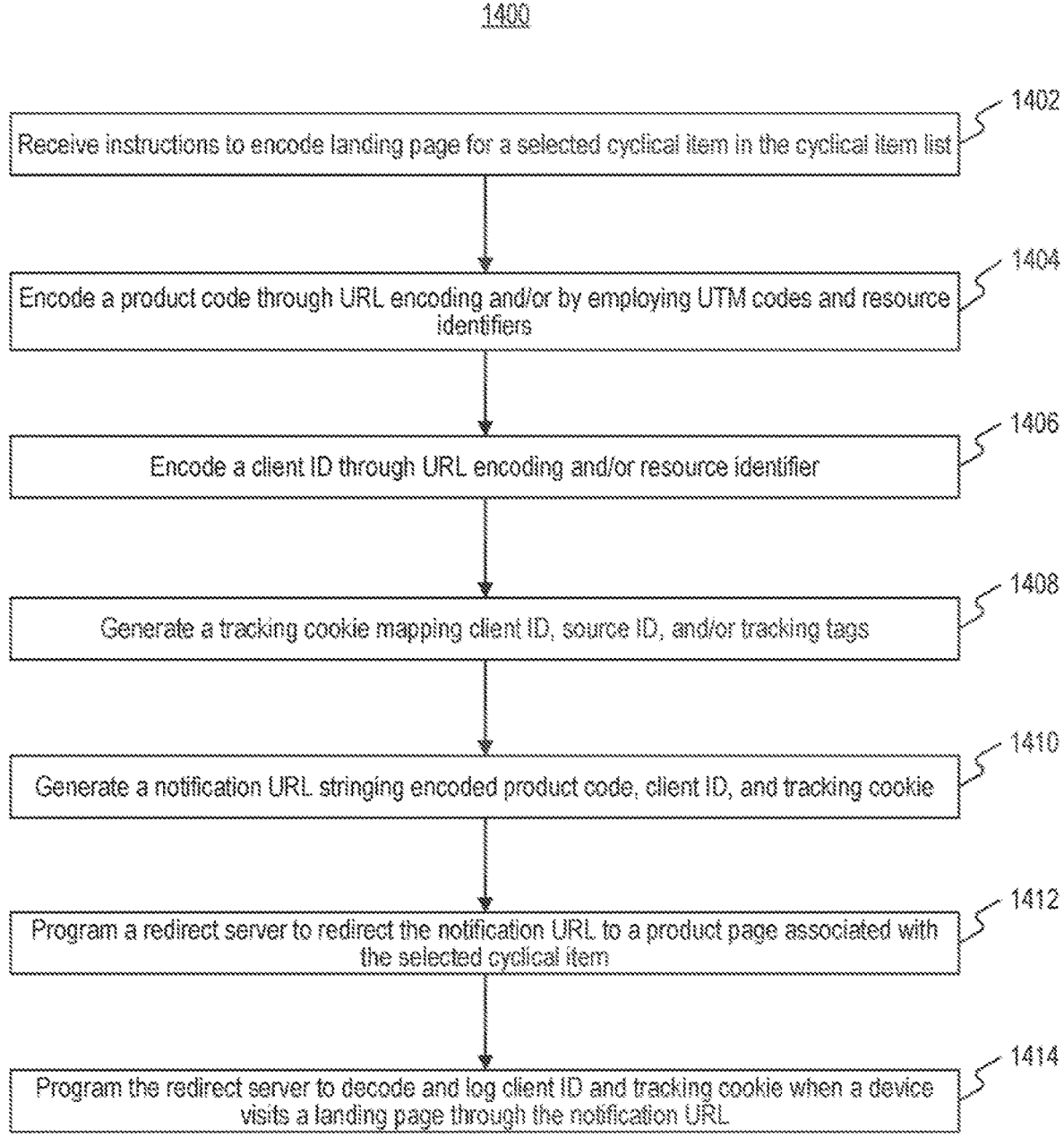
FIG. 14 is a flow chart of an exemplary landing page encoding process, consistent with disclosed embodiments.

FIG. 14 is a flow chart of an exemplary landing page encoding process 1400, consistent with disclosed embodiments. In some embodiments, elements of system 300 may perform process 1400. For example, as disclosed in the steps description below, APN system 320 may perform process 1400. In particular, landing page encoder 648 may perform process 1400. Alternatively, or additionally, computer clusters 390 may perform process 1400, or parts of process 1400. Further, in other embodiments system 100, or parts of system 100, may perform process 1400. For instance, external front end system 103 and/or SAT 101 may perform process 1400. In some embodiments, process 1400 may follow process 1000. In other embodiments, process 1400 may be independent from process 1000.

In step 1402, APN system 320 may receive instructions to encode a landing page for a selected cyclical item in the cyclical item list. For example, lifecycle push coordinator 704 (FIG. 7) may request the preparation of a payload for a push notification of a selected product. In step 1404, APN system 320 may encode a product code through URL encoding and/or by employing UTM codes and resource identifiers. For instance, APN system 320 may use landing page encoder 648 (FIG. 6) to encode a product code in a URL. In step 1406, APN system 320 may encode a client ID through the URL encoding and/or the resource identifiers. As explained in connection with FIG. 6, APN system 320 may encode the client ID for tracking purposes as part of an individualized URL for landing page.

In step 1408, APN system 320 may generate a tracking cookie. The tracking cookie may map a client ID (specifying the targeted user), a source ID (specifying a campaign code or source of the notification), and/or tracking tags. In some embodiments, the tracking cookie may include an HTTP cookie, which may include session cookies (specifying time, date, and/or encoding campaign) or persistent cookies (associated with client devices). In step 1410, APN system 320 may generate a notification URL stringing encoded product code, client ID, and tracking cookie. For example, APN system 320 may generate a landing page with a notification URL that may be included in a push notification payload and that it is used to encode product code, client ID, and a tracking cookie or device. In some embodiments, the tracking cookie may encode a source ID specifying a campaign source and the client ID. Additionally, the tacking cookie may also be encoded to specify an index to the first message and the first product image to facilitate bucket or split-run testing, as described in connection with FIG. 18.

In step 1412, APN system 320 may program a redirect server to redirect the notification URL to a product page associated with the selected cyclical item. In some embodiments, APN system 320 may use redirection in edge and/or CDN servers to track user engagement and adapt notifications based on user response. In such embodiments, APN system 320 may program redirect servers to redirect certain URLs to certain product pages, such as SDP (FIG. 1C). The configured redirection may be based on portion of the URL (e.g., the encoded product code) or the full encoded URL. In addition to step 1412, in some embodiments APN system 320 may also perform step 1414 to facilitate the evaluation of user engagement with push notifications. In step 1414, APN system 320 may also program the redirect server to decode and log client ID and tracking cookie when a device visits a landing page through the notification URL.

The compilation of client activity through the redirect server may allow APN system 320 to train ML models that modify priority scores and category rankings. For example, APN system 320 may generate a training dataset associating transmitted notifications and redirection logs from the redirect server, train a machine learning model using the training dataset, employ the machine learning model to identify the notifications with highest click through rates, and adjust the priority scores and rankings of the category IDs based on the click through rates.

Figure 15:
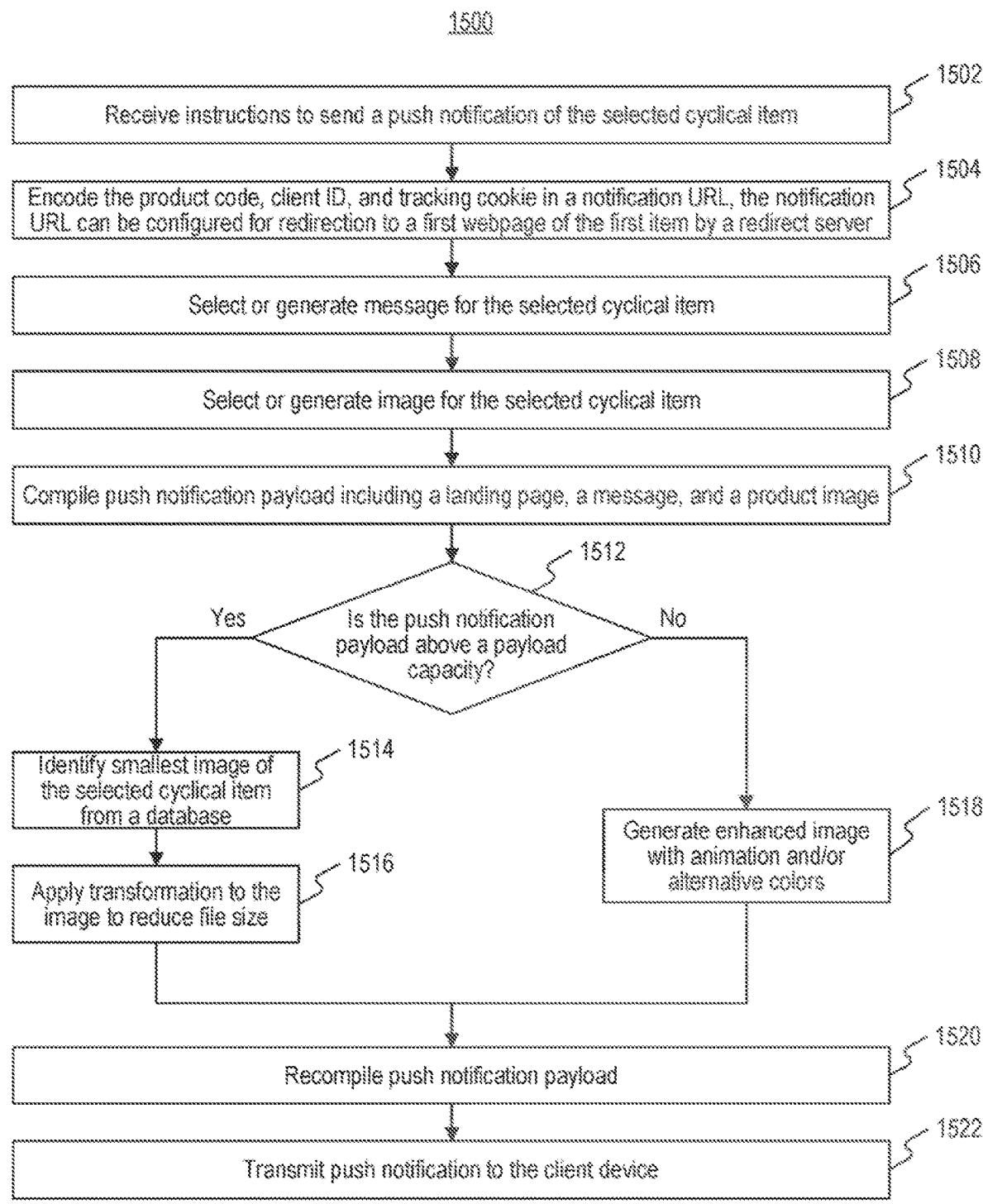
FIG. 15 is a flow chart of an exemplary process for compiling push notification payload and transmitting the push notifications, consistent with disclosed embodiments.

FIG. 15 is a flow chart of an exemplary process 1500 for compiling push notification payload and transmitting the push notifications, consistent with disclosed embodiments. In some embodiments, elements of system 300 may perform process 1500. For example, as disclosed in the steps description below, APN system 320 may perform process 1500. Alternatively, or additionally, online resources 340 may perform process 1500, or parts of process 1500. Further, in other embodiments systems 100 or 700 may perform process 1500. In some embodiments, process 1500 may follow process 1400. In other embodiments, process 1500 may be independent from process 1400.

In step 1502, APN system 320 may receive instructions to send a push notification of the selected cyclical item. For example, push system 710 may instruct APN system 320 to transmit a push notification through communication device 324 and/or by interfacing online resources 340 such as APNS that push content to client devices 350. In step 1504, APN system 320 may encode the product code, client ID, and tracking cookie in a notification URL. In some embodiments, as explained in connection with FIG. 14, the notification URL may be configured for redirection to a first webpage of the first item by a redirect server.

In step 1506, APN system 320 may select or generate a message for the selected cyclical item. For example, as further disclosed in FIG. 16, APN system 320 may select a message based on split-run testing results. Alternatively, or additionally, APN system 320 may generate a message based on campaign goals and/or manager-defined parameters. Similarly, in step 1508 APN system 320 may select or generate an image for the selected cyclical item. For example, as discussed in connection with FIG. 8, APN system 320 may perform a search query to identify images of products associated with the product to be pushed.

In step 1510, APN system 320 may compile a notification payload including a landing page, a message, and an image. For example, APN system 320 may prepare a push notification payload with the encoded URL, a message selected or generated in step 1506, and the image identified in step 1508. In some embodiments, at step 1510 APN system 320 may create JSON dictionary and keys to include notifications. In step 1512, APN system 320 may determine whether the push notification payload is above a payload capacity. For example, APN system 320 may compare the compiled push notification with the payload restrictions of the push notification system. If the push notification payload is above the capacity (Step 1512: Yes), APN system 320 may continue to step 1514 and identify smallest image of the selected cyclical item or product from a database (such as database 380). Further, in step 1516 APN system 320 may apply a transformation to the image to reduce file size. For example, APN system 320 may modify colors, resolution, dimensions, and/or definition to seek to comply with the payload restrictions. However, if APN system 320 determines the push notification is not above the capacity (step 1512: No), APN system 320 may continue to step 1518 and generate enhanced images with animations and/or alternative colors. For example, in step 1518 APN system 320 may include Graphics Interchange Format (GIF) files or animated images in the payload given that there is available capacity. The combination of steps 1514-1518 allows the generation of personalized push notifications, improving the technical field of push notification because it allows the use of personalized messages that improve CTRs.

In step 1520, APN system 320 may recompile the push notification payload. In step 1522, APN system 320 may transmit the push notification to the client device. For example, APN system 320 may interface with APNS or GCM to transmit the push notification with the recompiled payload.

Moreover, as part of process 1500 APN system 320 may configure APN processors 322 to perform operations of retrieving a plurality of images associated with the first item, selecting the smallest image from the plurality of images as the first product image, evaluating whether the payload is below a threshold weight; and generating a transformed image for notification in response to determining the payload is above the threshold weight.

Figure 16:
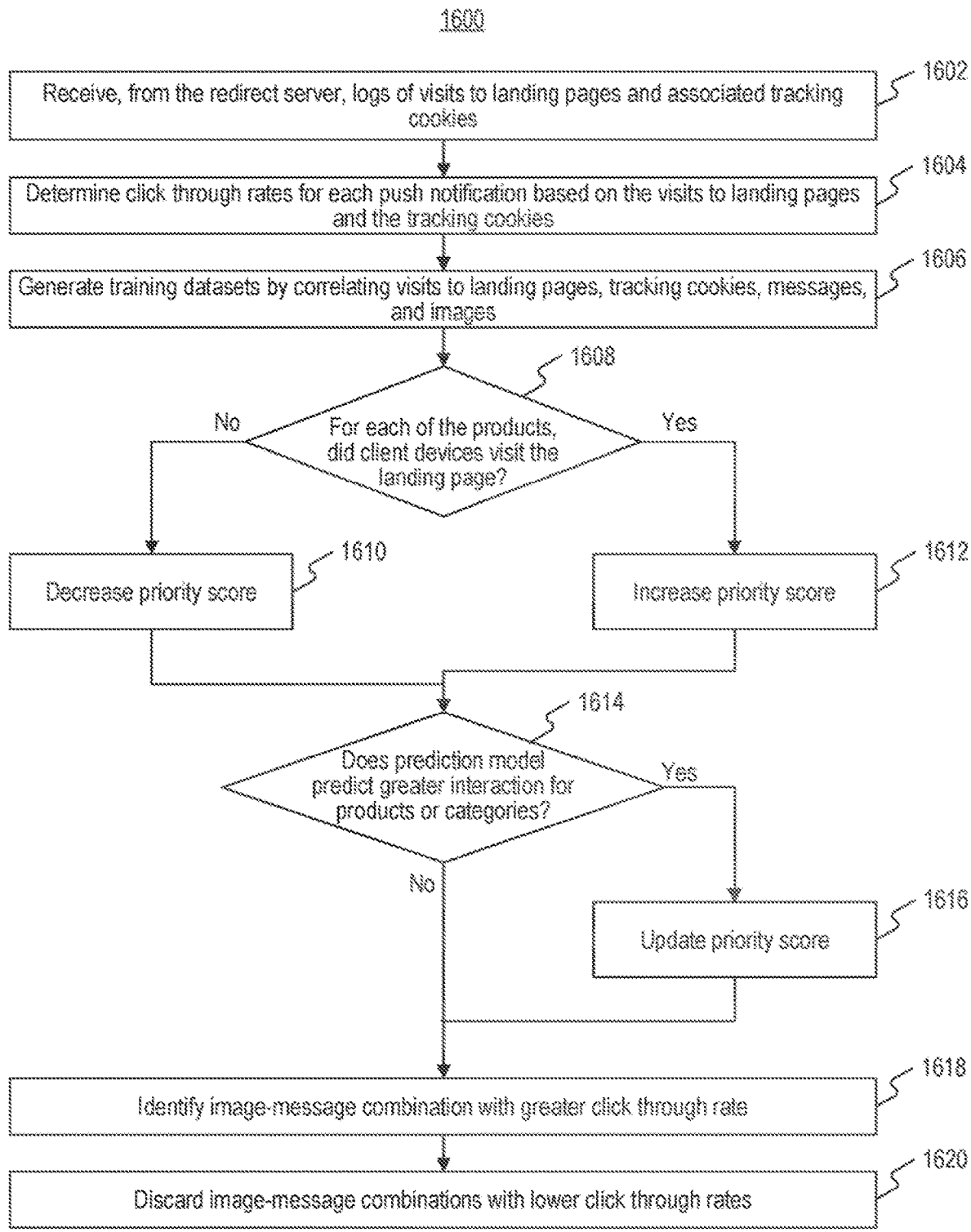
FIG. 16 is a flow chart of an exemplary process for adapting ranked categories and recurrent or cyclical items based on tracking information, consistent with disclosed embodiments.

FIG. 16 is a flow chart of an exemplary process 1600 for adapting ranked categories and recurrent or cyclical items based on tracking information, consistent with disclosed embodiments. In some embodiments, elements of system 300 may perform process 1600. For example, as disclosed in the steps description below, APN system 320 may perform process 1600. Alternatively, or additionally, online resources 340 may perform process 1600, or parts of process 1600. Further, in other embodiments system 100, or parts of system 100, may perform process 1600. For instance, external front end system 103 and/or SAT 101 may perform process 1600. In some embodiments, process 1600 may follow process 1500. In other embodiments, process 1600 may be independent from process 1500.

In step 1602, APN system 320 may receive, from a redirect server, logs of visits to landing pages and associated tracking cookies. For example, APN system 320 may request redirect logs from online resources 340. In step 1604, APN system 320 may determine click through rates for each push notification based on the visits to landing pages and the tracking cookies. For example, using track cookies, watermarks, and/or prints, APN system 320 may determine CTRs for notifications transmitted at, for example, step 1522. Moreover, in step 1606 APN system 320 may generate training datasets by correlating visits to landing pages, tracking cookies, messages, and images sent through push notifications. For example, APN system 320 may evaluate whether users visited single display pages through the redirection of a redirect server.

In step 1608, APN system 320 may determine whether for each of the products the client visited the landing page. For example, in step 1608 APN system 320 may determine the CTR for specific products and categories. If APN system 320 determines that the client visited the landing page (Step

1608: Yes), APN system 320 may increase the priority score for the product because clients are engaging with the product. If, however, APN system 320 determines the client did not visit the landing page (Step 1608: No), APN system 320 may decrease the priority score. In this way, APN system 320 may automate the selection and generation of push notification content to improve push notification technology by facilitating adaptation of recurrent push notifications.

In step 1614, APN system 320 may determine whether a prediction model predicts greater interaction for specific products or categories. For example, ML & Split-Run Trainer 646 (FIG. 6) may use the redirect logs may to train models that associate months of the year with greater purchases of certain products or categories. Based on such association an ML model may modify the priority score. If the prediction models predict greater interaction for certain products or categories (step 1614: Yes), APN system 320 may continue to step 1616 and update the priority score based on the prediction models (e.g., increasing the priority score of products with greater likelihood of purchase).

In step 1618, APN system 320 may use the redirect logs to identify image-message combination with greater click through rate. For example, using the tracking cookie and encoded product, image, or message IDs, APN system 320 may determine which combination of images and messages for a specific product resulted in the greatest number of interactions. In step 1620, APN system 320 may discard image message combinations with lower click-through-rates. Therefore, process 1600 enables automated adaptation of recurrent push notifications to enhance interaction and reduce user fatigue.

Figure 17:
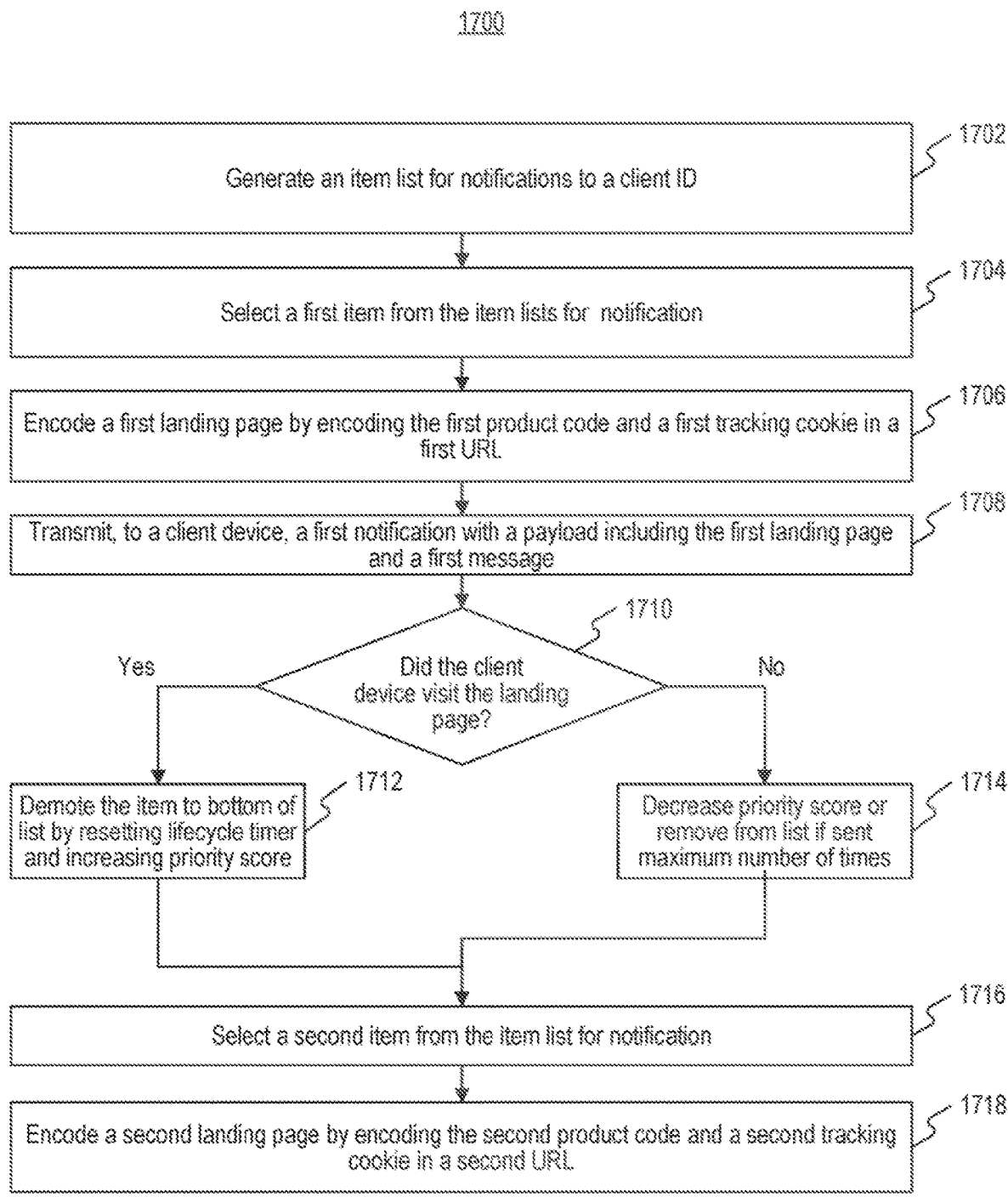
FIG. 17 is a flow chart of an exemplary process for generating adaptive push notifications, consistent with disclosed embodiments.

FIG. 17 is a flow chart of an exemplary process 1700 for generating adaptive push notifications, consistent with disclosed embodiments. In some embodiments, elements of system 300 may perform process 1700. For example, as disclosed in the steps description below, APN system 320 may perform process 1700. Alternatively, or additionally, online resources 340 may perform process 1700, or parts of process 1700. Further, in other embodiments system 100 or system 700 may perform process 1700. For instance, external front end system 103 and/or SAT 101 may perform process 1700.

In step 1702, APN system 320 may generate an item list for notifications to a client ID. The item list may be associated with, or indexed to, category IDs and product IDs. For example, as further discussed in connection with FIG. 9, the item list may be sorted and organized based on both product and category IDs. Moreover, items in the item list may be associated with priority scores and lifecycle timers. For example, as discussed in connection with FIGS. 10 and 13, APN system 320 may assign lifecycle timers and priority scores.

In step 1704, APN system 320 may select a first item from the item list (e.g., product table 920) for notification. In some embodiments, the first item may be selected having a highest priority score and a lowest lifecycle timer. Further, as shown in FIG. 9, the selected item may be associated with a product code and a first category ID. In step 1706, APN system 320 may encode a first landing page by encoding the first product code and a first tracking cookie in a first URL. Further, as described in connection with FIG. 14, APN system 320 may configure the first URL to trigger redirection to a first webpage of the first item by a redirect server.

In step 1708, APN system 320 may transmit, to a client device, a first notification with a payload including the first landing page and a first message. As discussed in connection with FIG. 15, APN system 320 may compile, recompile, and then transmit a push notification with a payload that includes encoded URLs, messages, and images.

In step 1710, APN system 320 may determine whether the client device visited the encoded landing page. As explained in connection with FIG. 16, APN system 320 may analyze redirect logs and recorded tracking cookies to determine whether client devices visited the pages. For example, APN system 320 may determine whether the client device visited the first landing page by searching the first tracking cookie in redirection logs of the redirect server. If APN system 320 determines that the client device visited the landing page (step 1710: Yes), APN system 320 may continue to step 1712 and demote the visited item by resetting the associated lifecycle timer but increasing the priority score. In this way, other products will be shown to the user but the system can track this is an item with high interaction and, thus, high priority score. However, if APN system 320 determine that the client device did not visit the landing page (step 1710: No), APN system 320 may continue to step 1714 and decrease the priority score of the item or remove it from the cyclical item list if, for example, a maximum number of push notifications have been transmitted. Alternatively, or additionally, APN system 320 may modify the priority scores and updating the lifecycle timers by increasing a priority score of the first item and resetting a lifecycle timer of the first item in response to determining the client device visited the first landing page while decreasing the priority score and delaying the lifecycle timer in response to determining the client device did not visit the first landing page.

In step 1716, APN system 320 may select a second item from the item list for notification. The second item may be associated with a second product code and a second category ID. In some embodiments, the second product may be selected so the second category ID is different than the first category ID to enhance category diversity. In step 1718, APN system 320 may encode a second landing page by encoding the second product code and a second tracking cookie in a second URL. Similar to the first URL, the second URL may be configured to cause redirection to a second webpage of the second item by the redirect server.

In some embodiments, process 1700 may get replicated for the selection of second and third items for push notification. For example, after the selection and transmission of the first item for push notification, APN system 320 may send additional items, which may be selected based on enhanced diversity and/or rankings in product table 920 (FIG. 9). Thus, in some embodiments, APN system 320 may process additional items with operations similar to the ones of process 1700. For example, APN system 320 may encode a second landing page by encoding a second product code and a second tracking cookie in a second URL. The second URL may be configured for redirection to a second webpage of the second item by the redirect server. Further, in response to determining a notification time lapsed after transmitting the first notification, APN system 320 may transmit, to a client device, a second notification with a second payload including the second landing page and a second message.

Further, after transmitting the second notification, APN system 320 may modify at least one of the priority scores and updating at least one of the lifecycle timers based on determining, using the second tracking cookie, whether client devices visited the second landing page. APN system 320 may also select a third item from one of the cyclical item list for notification, the third item being associated with a third product code and a third category ID, the third category ID being different from the first category ID and the second category ID. This third product code may be transmitted in a push notification when APN system 320 encodes a third landing page by encoding the third product code and a third tracking cookie in a third URL, the third URL being configured for redirection to a third webpage of the third item by the redirect server.

Figure 18:
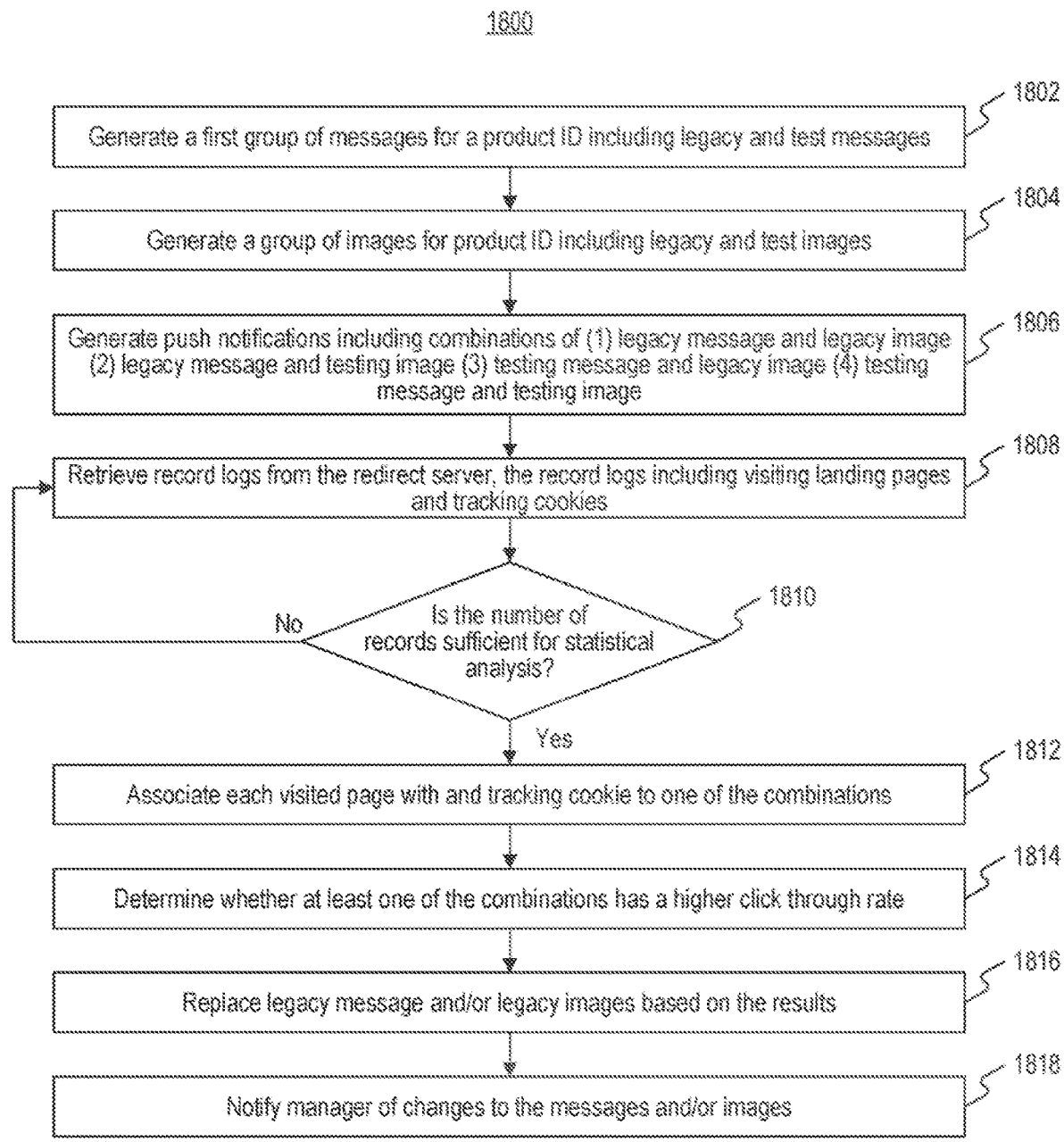
FIG. 18 is a flow chart of an exemplary process for bucket testing or split-run testing of push notification payloads, consistent with disclosed embodiments.

FIG. 18 is a flow chart of an exemplary process 1800 for bucket testing or split-run testing of push notification payloads, consistent with disclosed embodiments. In some embodiments, elements of system 300 may perform process 1800. For example, as disclosed in the steps description below, APN system 320 may perform process 1800. Alternatively, or additionally, online resources 340 may perform process 1800, or parts of process 1800. Further, in other embodiments system 100, or parts of system 100, may perform process 1800. In some embodiments, process 1800 may be performed concurrently with process 1700. In other embodiments, process 1800 may be independent from process 1800.

In step 1802, APN system 320 may generate a first group of messages for a product ID including legacy and test messages. For example, when encoding a first landing page in step 1706 (FIG. 17), APN system 320 may generate multiple messages for split-run testing. Similarly, in step 1804 APN system 320 may generate a group of images for product ID including legacy and test images.

In step 1806, APN system 320 may generate push notifications for a product including combinations of (1) legacy message and legacy image (2) legacy message and testing image (3) testing message and legacy image (4) testing message and testing image. For example, when lifecycle push coordinator 704 (FIG. 7) sends instructions to transmit push notifications, APN system 320 may send push notification with different combinations of messages and images that cover the different test or legacy combinations. Additionally, or alternatively, in step 1806 APN system 320 may select a first message from a legacy message or a testing message, the legacy message being different from the testing message, and select a first product image from a legacy image or a testing image, the legacy image being different from the testing image.

In step 1808, APN system 320 may retrieve record logs from the redirect server. In some embodiments, the record logs may include visits to landing pages and tracking cookies. For example, APN system 320 may query logs of edge servers from online resources 340. In step 1810, APN system 320 may determine whether the number of records in the record logs is sufficient for statistical analysis. For example, APN system 320 may have rules as to the minimum number of samples that is required for meaningful split-run testing. In some embodiments the rules for minimum number of samples set a specific number of samples and diversity conditions. Additionally, or alternatively, APN system 320 may determine whether the number of records is sufficient by using two-sided test with significance level $\alpha$ and power 1–$\beta$ using equation:

$$n = \frac{(\sigma_1^2 + \sigma_2^2)(z_{1-\alpha/2} + z_{1-\beta})}{\Delta^2}$$

If APN system 320 determines the number of records is insufficient for statistical analysis (step 1810: No), APN system 320 may return to step 1808 and continue collecting records from redirect servers. However, if APN system 320 determines the number of records is sufficient for statistical analysis (step 1810: Yes), APN system 320 may continue to step 1812.

In step 1812, APN system 320 may associate each visited page with and tracking cookie to one of the combinations. For example, APN system 320 may associate recorded visits in the logs to one of (1) legacy message and legacy image (2) legacy message and testing image (3) testing message and legacy image or (4) testing message and testing image. In step 1814, APN system 320 may determine whether at least one of the combinations has a higher click through rate. For example, APN system 320 may identify a message and image combination with highest clickthrough rate based on a message-image combination. And, based on the determination of step 1814, in step 1816 APN system 320 may replace legacy message and/or legacy images based on the results. For example, if testing images are performing better, then legacy images may be replaced. Similarly, if testing messages are performing better than legacy messages, then legacy messages may be replaced. In step 1818, APN system 320 may notify a manager of changes to the messages and/or images.

Figure 19:
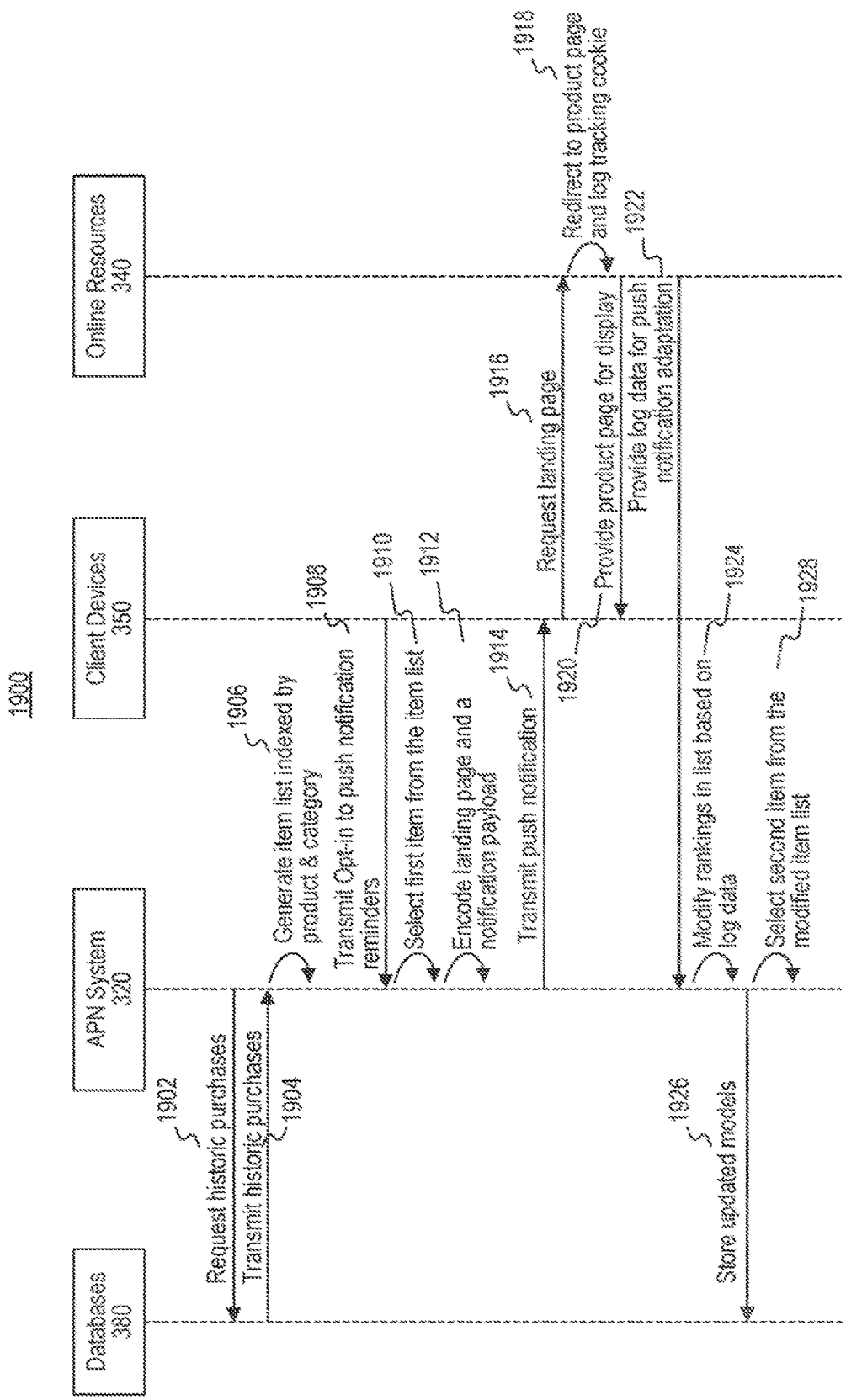
FIG. 19 is a timing diagram of an exemplary process flow for processing generating and transmitting adaptive push notifications, consistent with disclosed embodiments.

FIG. 19 is a timing diagram of an exemplary process flow 1900 for processing generating and transmitting adaptive push notifications, consistent with disclosed embodiments.

In some embodiments, as shown in FIG. 19, different elements of system 300 (FIG. 3) may perform specific steps of process flow 1900. For example, components of APN system 320 may perform one or more steps of process flow 1900, databases 380 may perform additional steps of process flow 1900, and client devices 350 may perform other steps of process flow 1900. In other embodiments, however, alternative elements of system 300 may perform the described steps (e.g., computer clusters 390 may perform certain steps) or a single element of system 300 may perform the described steps.

In step 1902, APN system 320 may request historic purchases from databases 380. For example, in preparation of determining cyclical item lists and/or assigning categories, APN system 320 may request historic purchases of users and/or segments of users. In step 1904, databases 380 may transmit the historic purchases.

In step 1906, APN system 320 may generate item lists indexed by product and category. For example, as discussed in connection with FIG. 12, APN system 320 may identify cyclical products and categories from the historic purchases and generate a list of items that may be organized and/or indexed based on category, product ID, priority scores, and lifecycle timers. Moreover, to initialize the adaptive and recurrent push notification process, in step 1908, client devices 350 may transmit opt-in to push notification reminders. For example, users may select preferences to enroll in push notification reminders.

In step 1910, APN system 320 may select a first item from the item list. For example, based on priority scores and lifecycle timers, APN system 320 may select an item for notification. In step 1912, APN system 320 may encode the landing page and a notification payload. For example, as discussed in connection with FIG. 15, APN system 320 may encode a landing page using landing page encoder 648 (FIG. 6) and compile a push notification. In step 1914, APN system 320 may transmit the push notification to client devices 350.

In step 1916 and in response to the push notification, client devices 350 may request a landing page. For example, a user may click in a landing page transmitted as part of the push notification. The request may be transmitted to online resources 340, which may include redirect servers, edge servers, and/or CDN servers. In step 1918, online resources 340 may redirect the client's request to a product page. For example, online resources 340 may redirect the request to a single display page (SDP) as described in connection with FIG. 1C. In addition, in step 1918, online resources 340 may log the redirection and any tracking cookies associated with the request for a landing page from step 1916. In step 1920, online resources 340 may provide a product page for display. For example, a CDN server may deliver a product page to the client device.

Additionally, in step 1922 online resources 340 may provide APN system 320 log data for push notification adaptation. As discussed in connection with FIG. 16, APN system 320 may request and or receive logs of visits to landing pages and associated tracking cookies from online resources 340. In step 1924, APN system 320 may modify rankings in the product or category list based on the log data. For example, APN system 320 may modify priority scores and/or times based on the log data from online resources 340. Alternatively, or additionally, APN system 320 may use log data as training data for developing ML models and/or perform split-run testing, as described in connection with FIG. 18.

In step 1926, APN system 320 may store updated models in databases 380. For example, APN system 320 may store selected images, messages, or models with higher CTR as identified in the analysis of step 1914.

In step 1928, APN system 320 may prepare for a new push notification, which would reinitiate the process described above in steps 1910-1926, by selecting a second item from the modified item list for push notification. These iterations enable automated selection and monitoring of notification content. Thus, process flow 1900 shows how APN system 320 may leverage the tracking cookies and server redirection to improve adaptation of the push notifications.

Figure 20:
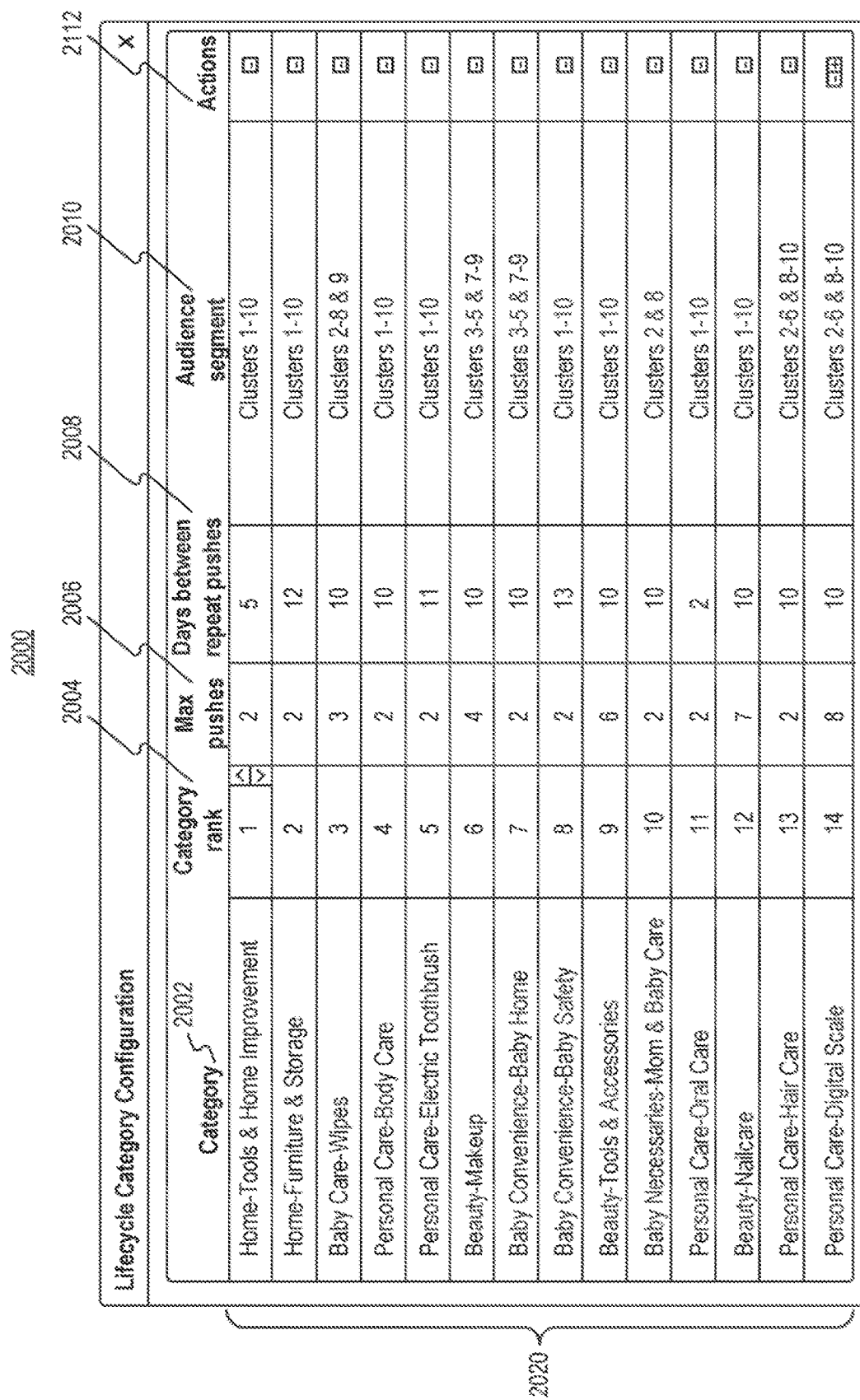
FIG. 20 is an exemplary graphical user interface for collecting manager-defined parameters and rankings, consistent with disclosed embodiments.

FIG. 20 is an exemplary graphical user interface (GUI) 2000 for collecting manager-defined parameters and rankings, consistent with disclosed embodiments. As disclosed in connection with FIG. 10, APN system 320 may generate a GUI for an operation as part of a process for setting up a campaign. In such embodiments, APN system 320 may generate GUI 2000 for collecting information for transmitting a push notification ofa recurrent and/or cyclical item to a client device. In some embodiments, APN system 320 may generate and display GUI 2000 to collect feedback or configurations from operators and/or campaign managers. Further, in some embodiments APN system 320 may generate GUI 2000 with pre-populated values as determined by history purchase data and/or ML predictions.

As shown in FIG. 20, GUI 2000 may list multiple categories 2020. These categories may be related to the categories 918 (FIG. 9). GUI 2000 may include a table with a category 2002 column, a category rank 2004, a max number of pushes 2006, and a days between repeat pushes variable 2008. The category rank 2004 may be modified by an operator and the category rank 2004 column may be programmed to reorder categories 2020 based on the selected rank. Max pushes 2006 and days between pushes 2008 may be modifiable through textbox input and may be programmed to include value restrictions. For example, max pushes 2006 and days between pushes 2008 may require a minimum number or days and a maximum number of pushes.

GUI 2000 may also include an audience segment 2012, which may be pre-populated based on selections by audience platform 706 (FIG. 7). Further, GUI 2000 may include an actions column with buttons that allow operators to modify parameters for each one of the categories or re-arrange product distribution within the categories.

In some embodiments, variables in GUI 2000 may be prepopulated based on ML models and/or historic purchase analysis. For example, ML & split-run trainer 646 may generate a model that prepopulates variables in GUI 2000 for CTR optimization. Further, in some embodiment APN system 320 may display GUI 2000 in devices associated with managers, collect campaign goals and manager-defined parameters from the graphical user interface, and adjust the priority scores and lifecycle timers based on the campaign goals and the manager-defined parameters.

Figure 21:
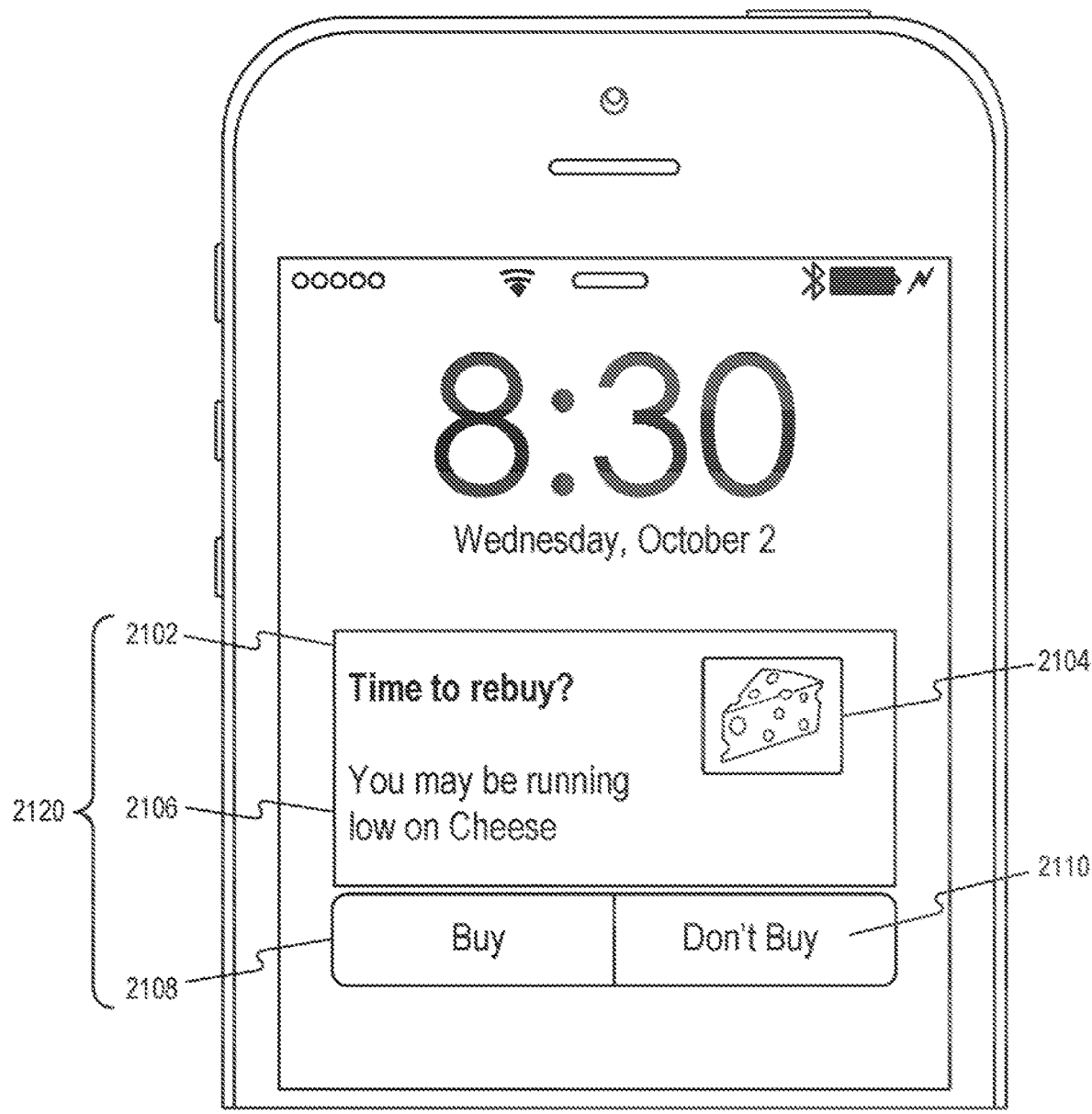
FIG. 21 is an exemplary graphical user interface in mobile device showing an adaptive push notification, consistent with disclosed embodiments.

FIG. 21 is an exemplary graphical user interface 2100 in mobile device showing an adaptive push notification, consistent with disclosed embodiments. In some embodiments, GUI 2100 may be displayed in client devices 350 at step 1522 (FIG. 15) or step 1914 (FIG. 19) when APN system 320 transmit push notifications.

GUI 2100 may include a push notification area 2120 with a title 2102, a message 2106, and an image 2104. As discussed in connection with FIGS. 17-18 these elements may be programmed as part of the push notification payload by APN system 320. Additionally, GUI 2100 may include a first button 2108 and a second button 2110. First button 2108 and second button 2110 may be associated with different landing pages encoded by APN system 320. For example, first button 2108 may be programmed to open a web browser or a mobile application with an SDP. As discussed above, client devices 350 may be redirected through a redirect server and the tracking cookie or visit activity may be logged and stored by the server. Second button 2110 may also be associated with a URL and configured to open the landing page when clicked. For example, when a user interacts with second button 2110, a web browser may direct the user to a page to opt-out from the push notification reminders. Like for first button 2108, the second button 2110 may also have a URL that triggers redirection to a page to enable tracking of interactions and/or user engagement.

Figure 22:
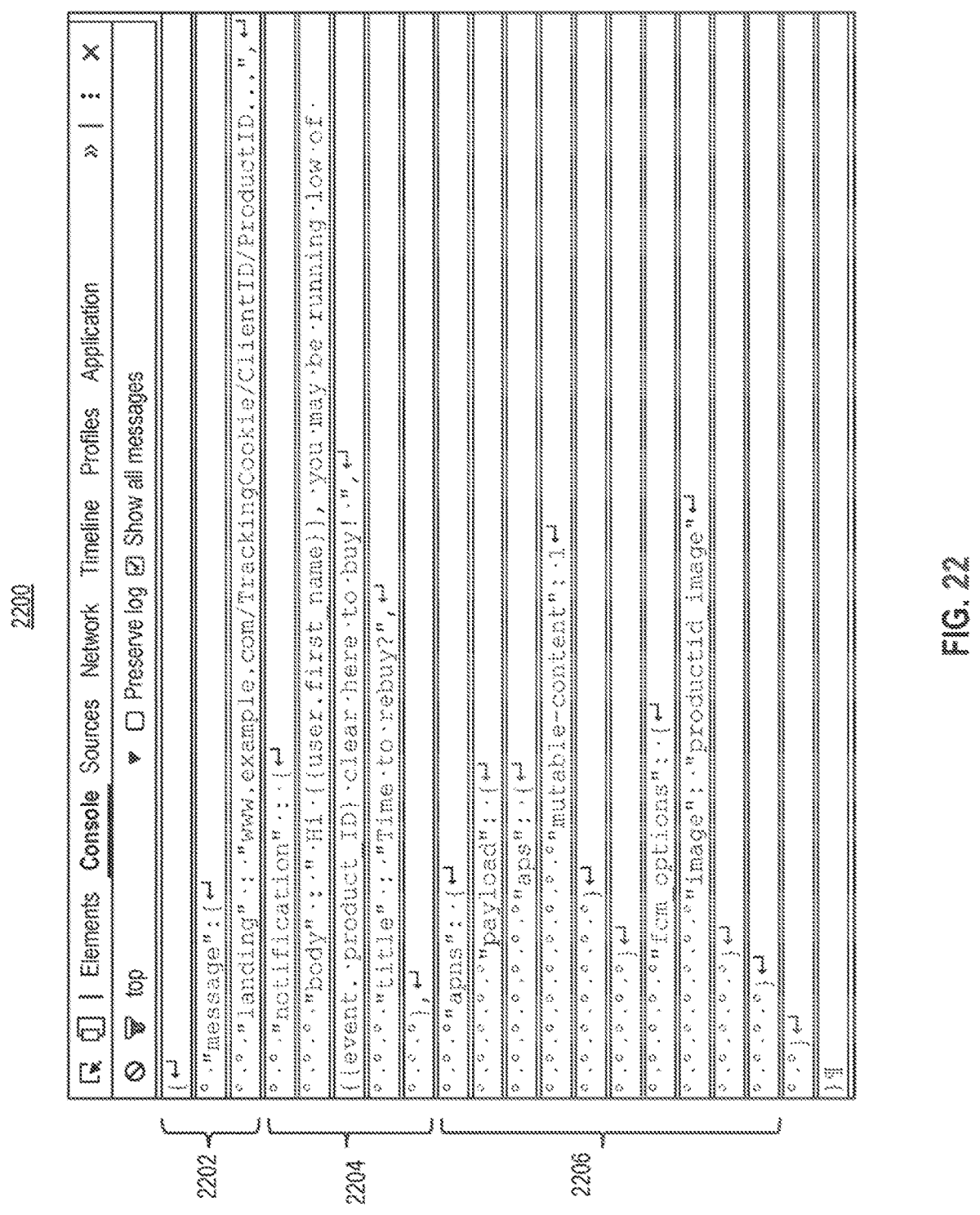

FIG. 22 is an exemplary graphical user interface 2200 showing source code with payload configuration, consistent with disclosed embodiments. GUI 2200 shows a payload configuration that includes a landing page portion 2202, a notification portion 2204, and an image portion 2206. In some embodiments, the transmission of a payload like the one described in GUI 2200 may trigger the display of a push notification similar to the one shown in FIG. 21. As shown in FIG. 22, landing page portion 2202 may include a URL with encoded tracking devices and/or specifying products, clients, and/or specific UTM codes. Notification portion 2204 may include customizable messages and image portion 2206 may include product images.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system comprising:
one or more processors;
one or more databases; and
one or more memory devices storing instructions that, when executed by the one or more processors, configure the one or more processors to perform operations comprising:
computing average times of repeated purchases for a plurality of products based on a record of aggregated historic purchases, each of the plurality of products being associated with one or more product categories;
generating a notifications list sorting the plurality of products based on priority scores and lifecycle timers, the priority scores being based on the product categories and the lifecycle timers being based on the average times;
transmitting, to a client device, a first notification with a first payload comprising a first URL, the first URL encoding a first landing page, the first landing page being directed to a webpage of a first item with a highest priority score and a lowest lifecycle timer in the notifications list;
determining whether a user interacted with the first notification;
in response to determining the user interacted with the first notification, modifying at least one of the priority scores or at least one of the lifecycle timers; and
after generating the notifications list, generating a graphical user interface for an operator, the graphical user interface displaying a ranking of the plurality of products and campaign parameters,
wherein:
the graphical user interface displays a plurality of categories, each of the plurality of categories being associated with a frequency notification input element, a maximum push notification input element, and a category ranking input element; and
the frequency notification input element, the maximum notification input element, and the category ranking input element are pre-populated with default values determined based on the aggregated historic purchases.

2. The system of claim 1, wherein the operations further comprise:
determining whether an operator changed at least one of the default values in the graphical user interface; and
in response to determining the operator changed the at least one of the default values, updating the notifications list based on selections in the graphical user interface.

3. The system of claim 1, wherein:
the first notification is a push notification; and
transmitting the first notification comprises communicating the first payload and client device data to a notification service.

4. The system of claim 1, wherein the notifications list associates the plurality of products with a plurality of product images.

5. The system of claim 4, wherein the operations comprise:
collecting a plurality of user interactions with transmitted notifications;
identifying combinations of one of the plurality of products with one of the plurality of product images having click through rate below a threshold; and
removing the combinations from the notifications list.

6. The system of claim 1, wherein determining whether the user interacted with the first notification comprises retrieving record logs from a redirect server, the record logs including visited landing pages.

7. The system of claim 1, wherein:
each of the plurality of products is associated with a category; and
generating the notifications list comprises:
determining a first product from the plurality of products has a first category;
determining second product from the plurality of products has a second category, the second category being equal to the same category; and
in response to determining the first product and the second product are consecutive in the notifications list, reducing a priority score of the second product.

8. The system of claim 1, wherein the operations further comprise:
after a period lapsed, transmitting, to the client device, a second notification with a second payload comprising a second URL, the second URL encoding a second landing page different from the first landing page, the second landing page being directed to a webpage of a second item in the notifications list;
determining whether the user interacted with the second notification; and
in response to determining the user interacted with the second notification, increasing a priority score associated with the second item.

9. A computer implemented method comprising:
computing average times of repeated purchases for a plurality of products based on a record of aggregated historic purchases, each of the plurality of products being associated with one or more product categories;
generating a notifications list sorting the plurality of products based on priority scores and lifecycle timers, the priority scores being based on the product categories and the lifecycle timers being based on the average times;
transmitting, to a client device, a first notification with a first payload comprising a first URL, the first URL encoding a first landing page, the first landing page being directed to a webpage of a first item with a highest priority score and a lowest lifecycle timer in the notifications list;
determining whether a user interacted with the first notification; and
in response to determining the user interacted with the first notification, modifying at least one of the priority scores or at least one of the lifecycle timers; and
after generating the notifications list, generating a graphical user interface for an operator, the graphical user interface displaying ranking of the plurality of products and campaign parameters,
wherein:
the graphical user interface displays a plurality of categories, each of the plurality of categories being associated with a frequency notification input element, a maximum push notification input element, and a category ranking input element; and
the frequency notification input element, the maximum notification input element, and the category ranking input element are pre-populated with default values determined based on the aggregated historic purchases.

10. The method of claim 9, further comprising:
determining whether an operator changed at least one of the default values in the graphical user interface; and
in response to determining the operator changed the at least one of the default values, updating the notifications list based on selections in the graphical user interface.

11. The method of claim 9, wherein:
the first notification is a push notification; and
transmitting the first notification comprises communicating the first payload and client device data to a notification service.

12. The method of claim 9, wherein:
the notifications list associates the plurality of products with a plurality of product images; and
the method further comprises:
collecting a plurality of user interactions with transmitted notifications;
identifying combinations of one of the plurality of products with one of the plurality of product images having click through rate below a threshold; and
removing the combinations from the notifications list.

13. The method of claim 9, wherein determining whether the user interacted with the first notification comprises retrieving record logs from a redirect server, the record logs including visited landing pages.

14. The method of claim 9, wherein:
each of the plurality of products is associated with a category; and
generating the notifications list comprises:
determining a first product from the plurality of products has a first category;
determining second product from the plurality of products has a second category, the second category being equal to the same category; and
in response to determining the first product and the second product are consecutive in the notifications list, reducing a priority score of the second product.

15. The method of claim 9, further comprising:
after a period lapsed, transmitting, to the client device, a second notification with a second payload comprising a second URL, the second URL encoding a second landing page different from the first landing page, the second landing page being directed to a webpage of a second item in the notifications list;
determining whether the user interacted with the second notification; and
in response to determining the user interacted with the second notification, increasing a priority score associated with the second item.

16. A non-transitory computer readable medium storing instructions that, when executed by at least one processor, cause the at least one processor to:
compute average times of repeated purchases for a plurality of products based on a record of aggregated historic purchases, each of the plurality of products being associated with one or more product categories;
generate a notifications list sorting the plurality of products based on priority scores and lifecycle timers, the priority scores being based on the product categories and the lifecycle timers being based on the average times;
transmit, to a client device, a first notification with a first payload comprising a first URL, the first URL encoding a first landing page, the first landing page being directed to a webpage of a first item with a highest priority score and a lowest lifecycle timer in the notifications list;

determine whether a user interacted with the first notification; and in response to determining the user interacted with the first notification, modify at least one of the priority scores or at least one of the lifecycle timers; and after generating the notifications list, generate a graphical user interface for an operator, the graphical user interface displaying ranking of the plurality of products and campaign parameters, wherein:
- the graphical user interface displays a plurality of categories, each of the plurality of categories being associated with a frequency notification input element, a maximum push notification input element, and a category ranking input element; and
- the frequency notification input element, the maximum notification input element, and the category ranking input element are pre-populated with default values determined based on the aggregated historic purchases.

* * * * *